US012781067B2

(12) United States Patent
Asakawa

(10) Patent No.: US 12,781,067 B2
(45) Date of Patent: Nov. 3, 2026

(54) INK SET AND RECORDING METHOD

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 111 days.

(21) Appl. No.: 18/423,390

(22) Filed: Jan. 26, 2024

(65) Prior Publication Data

US 2024/0254357 A1 Aug. 1, 2024

(30) Foreign Application Priority Data

Jan. 27, 2023 (JP) ................................ 2023-010881

(51) Int. Cl.
*C09D 11/023* (2014.01)
*B41J 2/21* (2006.01)
(Continued)

(52) U.S. Cl.
CPC ........... *C09D 11/037* (2013.01); *B41J 2/2114* (2013.01); *C09D 11/023* (2013.01); *C09D 11/10* (2013.01);
(Continued)

(58) Field of Classification Search
CPC ....... C09D 11/02; C09D 11/023; C09D 11/03; C09D 11/037; C09D 11/10; C09D 11/32;
(Continued)

(56) References Cited

U.S. PATENT DOCUMENTS 6,299,675 B1 * 10/2001 Ono ....................... C09D 11/30 347/100
2004/0035320 A1 * 2/2004 Sano .................... C09D 11/322 106/31.89

(Continued)

FOREIGN PATENT DOCUMENTS

JP 2019-059872 A 4/2019
JP 2019-162840 A 9/2019

(Continued)

*Primary Examiner* — Douglas X Rodriguez
*Assistant Examiner* — Kendrick X Liu
(74) *Attorney, Agent, or Firm* — Harness, Dickey & Pierce, P.L.C.

(57) ABSTRACT

An ink set includes a process liquid containing a flocculant; a first ink composition that contains a color material, is a thick ink, and is an aqueous ink; and a second ink composition that contains a color material, the content of the color material being smaller than that of the color material in the first ink composition, is a thin ink in a similar color to that of the first ink composition, and is an aqueous ink. When the second ink composition and a 5 mass % aqueous solution of calcium propionate are mixed at a mass ratio of "the former:the latter=10:1", the viscosity increasing rate of the former is 2.2 times or more. The second ink composition satisfies one or more of the following requirements (1) and (2): (1) containing a pigment as the color material, wherein
(Continued)

the pigment is dispersed in a dispersant resin, and the dispersant resin is a block copolymer including a block having a carboxy group and a block not having a carboxy group; and (2) containing one or more of maleic acid, acrylic, and urethane water-soluble resins that are soluble in a solvent component of the ink.

13 Claims, 6 Drawing Sheets

(51) Int. Cl.

| | |
|---|---|
| ***C09D 11/037*** | (2014.01) |
| ***C09D 11/10*** | (2014.01) |
| ***C09D 11/30*** | (2014.01) |
| ***C09D 11/322*** | (2014.01) |
| ***C09D 11/326*** | (2014.01) |
| ***C09D 11/40*** | (2014.01) |
| ***C09D 11/54*** | (2014.01) |

(52) U.S. Cl.
CPC ............ *C09D 11/30* (2013.01); *C09D 11/322* (2013.01); *C09D 11/326* (2013.01); *C09D 11/40* (2013.01); *C09D 11/54* (2013.01)

(58) Field of Classification Search
CPC ... C09D 11/322; C09D 11/324; C09D 11/326; C09D 11/40; C09D 11/54; B41J 2/2107; B41J 2/2114
See application file for complete search history.

(56) References Cited

U.S. PATENT DOCUMENTS

| | | | | |
|---|---|---|---|---|
| 2004/0127601 | A1* | 7/2004 | Sano .................... | C09D 11/326 523/160 |
| 2008/0022887 | A1* | 1/2008 | Tanoue ................ | C09D 11/324 106/31.2 |
| 2009/0169762 | A1* | 7/2009 | Szajewski ............ | C09D 11/322 427/466 |
| 2019/0092958 | A1 | 3/2019 | Okuda et al. | |
| 2019/0284425 | A1* | 9/2019 | Okuda ................. | C09D 11/106 |
| 2019/0284426 | A1 | 9/2019 | Matsuzaki et al. | |
| 2020/0276827 | A1* | 9/2020 | Ishida .................. | B41J 11/0022 |
| 2022/0315786 | A1 | 10/2022 | Asakawa et al. | |
| 2023/0086133 | A1 | 3/2023 | Mizoe et al. | |

FOREIGN PATENT DOCUMENTS

| | | | |
|---|---|---|---|
| JP | 2022-152285 | A | 10/2022 |
| WO | 2021-229975 | A1 | 11/2021 |

* cited by examiner

FIG. 4

Table 1:

| | | | Thin ink A | Thin ink B | Thin ink C | Thin ink D | Thin ink E | Thin ink F | Thin ink G |
|---|---|---|---|---|---|---|---|---|---|
| Water-soluble low molecular organic compound (boiling point: 250°C or less) | Alkanediols | PG (Boiling point 188°C) | 10.0 | 10.0 | 10.0 | 10.0 | 10.0 | 10.0 | 10.0 |
| | | 1,2HD (Boiling point 224°C) | 1.0 | 1.0 | 1.0 | 1.0 | 1.0 | 1.0 | 1.0 |
| Water-soluble low molecular organic compound (boiling point: higher than 250°C) | Amides | CPL (Boiling point 267°C) | 2.0 | 2.0 | 2.0 | 2.0 | 2.0 | 2.0 | 2.0 |
| | Alkanolamines | TIPA (Boiling point 301°C) | 1.0 | 1.0 | 1.0 | 1.0 | 1.0 | 1.0 | 1.0 |
| Surfactant | Silicone | BYK-349 | 0.5 | 0.5 | 0.5 | 0.5 | 0.5 | 0.5 | 0.5 |
| | Acetylene | SURFYNOL DF110D | 0.1 | 0.1 | 0.1 | 0.1 | 0.1 | 0.1 | 0.1 |
| Pigment dispersion | Block polymer dispersion | Cyan pigment 1 | 0.5 | 0.5 | 0.5 | 0.5 | – | – | 0.5 |
| | Random polymer dispersion | Cyan pigment 2 | – | – | – | – | 0.5 | 0.5 | – |
| Resin particle | Acrylic | JONCRYL 631 | 6.0 | 6.0 | 6.0 | 6.0 | 6.0 | 6.0 | 6.0 |
| | Polyolefin | Hitec E-6500 | 0.5 | 0.5 | 0.5 | 0.5 | 0.5 | 0.5 | 0.5 |
| Water-soluble resin | Maleic acid | ARASTAR 703S | 0.5 | 1.0 | – | – | 0.5 | – | 1.5 |
| | Acrylic | Sokalan HP 69 AP | – | – | 0.5 | – | – | – | – |
| Pure water | | | Balance | Balance | Balance | Balance | Balance | Balance | Balance |
| Total | | | 100 | 100 | 100 | 100 | 100 | 100 | 100 |
| Viscosity increasing rate | | | 3.3 times | 3.5 times | 3.1 times | 3.0 times | 2.3 times | 2.0 times | 3.7 times |

FIG. 5

Table 2:

| | | | Thick ink A | Thick ink B | Thick ink C | Thick ink D | Thick ink E |
|---|---|---|---|---|---|---|---|
| Water-soluble low molecular organic compound (boiling point: 250°C or less) | Alkanediols | PG (Boiling point 188°C) | 10.0 | 10.0 | 10.0 | 10.0 | 10.0 |
| | | 1,2HD (Boiling point 224°C) | 1.0 | 1.0 | 1.0 | 1.0 | 1.0 |
| Water-soluble low molecular organic compound (boiling point: higher than 250°C) | Amides | CPL (Boiling point 267°C) | 2.0 | 2.0 | 2.0 | 2.0 | 2.0 |
| | Alkanolamines | TIPA (Boiling point 301°C) | 1.0 | 1.0 | 1.0 | 1.0 | 1.0 |
| Surfactant | Silicone | BYK-349 | 0.5 | 0.5 | 0.5 | 0.5 | 0.5 |
| | Acetylene | SURFYNOL DF110D | 0.1 | 0.1 | 0.1 | 0.1 | 0.1 |
| Pigment dispersion | Block polymer dispersion | Cyan pigment 1 | 2.0 | 2.0 | 2.0 | - | - |
| | Random polymer dispersion | Cyan pigment 2 | - | - | - | 2.0 | 2.0 |
| Resin particle | Acrylic | JONCRYL 631 | 6.0 | 6.0 | 6.0 | 6.0 | 6.0 |
| | Polyolefin | Hitec E-6500 | 0.5 | 0.5 | 0.5 | 0.5 | 0.5 |
| Water-soluble resin | Maleic acid | ARASTAR 703S | 0.2 | 0.5 | - | 0.2 | - |
| Pure water | | | Balance | Balance | Balance | Balance | Balance |
| Total | | | 100 | 100 | 100 | 100 | 100 |
| Viscosity increasing rate | | | 5.2 times | 5.4 times | 5.0 times | 3.5 times | 3.2 times |

FIG. 6

Table 3:

| | | | Process liquid A | Process liquid B | Process liquid C |
|---|---|---|---|---|---|
| Water-soluble low molecular organic compound (boiling point: 250°C or less) | Alkanediols | PG (Boiling point 188°C) | 20.0 | 20.0 | 20.0 |
| | | 1,2HD (Boiling point 224°C) | 1.0 | 1.0 | 1.0 |
| Water-soluble low molecular organic compound (boiling point: higher than 250°C) | Amides | CPL (Boiling point 267°C) | 2.0 | 2.0 | 2.0 |
| Flocculant | Organic acid | Malonic acid | 0.1 | 0.1 | 6.0 |
| | Polyvalent metal salt | Calcium propionate | 5.0 | – | – |
| | Cationic resin | Catiomaster PD-7 | – | 4.0 | – |
| Surfactant | Silicone | BYK-349 | 0.5 | 0.5 | 0.5 |
| | Acetylene | SURFYNOL DF110D | 0.1 | 0.1 | 0.1 |
| Pure water | | | Balance | Balance | Balance |
| Total | | | 100 | 100 | 100 |

FIG. 7

Table 4:

| | Example 1 | Example 2 | Example 3 | Example 4 | Example 5 | Example 6 | Example 7 | Example 8 |
|---|---|---|---|---|---|---|---|---|
| Light color ink | Light color ink A | Light color ink B | Light color ink C | Light color ink D | Light color ink E | Light color ink G | Light color ink A | Light color ink A |
| Deep color ink | Deep color ink A | Deep color ink A | Deep color ink A | Deep color ink A | Deep color ink A | Deep color ink A | Deep color ink B | Deep color ink C |
| Process liquid | Process liquid A | Process liquid A | Process liquid A | Process liquid A | Process liquid A | Process liquid A | Process liquid A | Process liquid A |
| Paper surface temperature | 35°C | 35°C | 35°C | 35°C | 35°C | 35°C | 35°C | 35°C |
| Wind velocity on paper | 0m/s | 0m/s | 0m/s | 0m/s | 0m/s | 0m/s | 0m/s | 0m/s |
| Friction resistance | A | B | B | A | A | C | B | AA |
| Solid image quality | A | AA | B | B | B | AA | AA | A |
| Head dew condensation | A | A | A | A | A | A | A | A |

| | Example 9 | Example 10 | Example 11 | Example 12 | Example 13 | Example 14 | Example 15 | Comparative Example 1 |
|---|---|---|---|---|---|---|---|---|
| Light color ink | Light color ink A | Light color ink A | Light color ink A | Light color ink A | Light color ink E | Light color ink E | Light color ink A | Light color ink F |
| Deep color ink | Deep color ink D | Deep color ink E | Deep color ink A | Deep color ink A | Deep color ink A | Deep color ink A | Deep color ink A | Deep color ink A |
| Process liquid | Process liquid A | Process liquid A | Process liquid B | Process liquid C | Process liquid A | Process liquid A | Process liquid A | Process liquid A |
| Paper surface temperature | 35°C | 35°C | 35°C | 35°C | 40°C | 35°C | 25°C | 35°C |
| Wind velocity on paper | 0m/s | 0m/s | 0m/s | 0m/s | 0m/s | 3m/s | 0m/s | 0m/s |
| Friction resistance | A | AA | A | A | A | A | A | A |
| Solid image quality | A | B | A | B | AA | AA | B | C |
| Head dew condensation | A | A | A | A | B | A | A | A |

INK SET AND RECORDING METHOD

The present application is based on, and claims priority from JP Application Serial Number 2023-010881, filed Jan. 27, 2023, the disclosure of which is hereby incorporated by reference herein in its entirety.

BACKGROUND

1. Technical Field

The present disclosure relates to an ink set and a recording method.

2. Related Art

In ink jet recording, it is performed to obtain an excellent image by using a process liquid for fixing (decreasing fluidity) ink droplets early on a recording medium. In order to reduce the granularity of a light-colored portion of the obtained image, it has been studied to use a thin ink in addition to a thick ink.

For example, JP-A-2019-162840 discloses an ink jet recording method using a process liquid, a thick ink, and a thin ink. This patent literature describes that the recorded matter obtained under specific recording conditions is excellent in color difference suppression.

However, ink bleed may occur in the image area where a thin ink has been used, and the image quality may be insufficient. It is inferred that one reason for this is that the content of the pigment in the thin ink is less than that in a thick ink and therefore the reactivity of the thin ink with the process liquid is low. Accordingly, an ink set that provides good image quality in medium to low density image areas is being demanded.

SUMMARY

An aspect of the ink set according to the present disclosure is an ink set comprising:

a process liquid containing a flocculant;

a first ink composition that contains a color material, is a thick ink, and is an aqueous ink; and a second ink composition that contains a color material, the content of the color material being smaller than that of the color material in the first ink composition, is a thin ink in a similar color to that of the first ink composition, and is an aqueous ink, wherein when the second ink composition and a 5 mass % aqueous solution of calcium propionate are mixed at a mass ratio of "the former:the latter=10:1", the viscosity increasing rate of the former is 2.2 times or more, and the second ink composition satisfies one or more of the following requirements (1) and (2):

(1) containing a pigment as the color material, wherein the pigment is dispersed with a dispersant resin, and the dispersant resin is a block copolymer including a block having a carboxy group and a block not having a carboxy group; and (2) containing one or more of maleic acid, acrylic, and urethane water-soluble resins that are soluble in a solvent component of the ink.

An aspect of the recording method according to the present disclosure is a method of recording using the ink set described above on a recording medium, the method comprising:

a process liquid adhesion step of allowing the process liquid to adhere to a recording medium;

a first ink adhesion step of allowing the first ink composition to adhere to the recording medium; and a second ink adhesion step of allowing the second ink composition to adhere to the recording medium.

BRIEF DESCRIPTION OF THE DRAWINGS

FIG. 4 is Table 1 showing the compositions and so on of thin inks used in Examples and Comparative Example.

FIG. 5 is Table 2 showing the compositions and so on of thick inks used in Examples and Comparative Example.

FIG. 6 is Table 3 showing the compositions of the process liquids used in Examples and Comparative Example.

FIG. 7 is Table 4 showing the conditions and evaluation results of Examples and Comparative Example.

DESCRIPTION OF EMBODIMENTS

Figure 1:
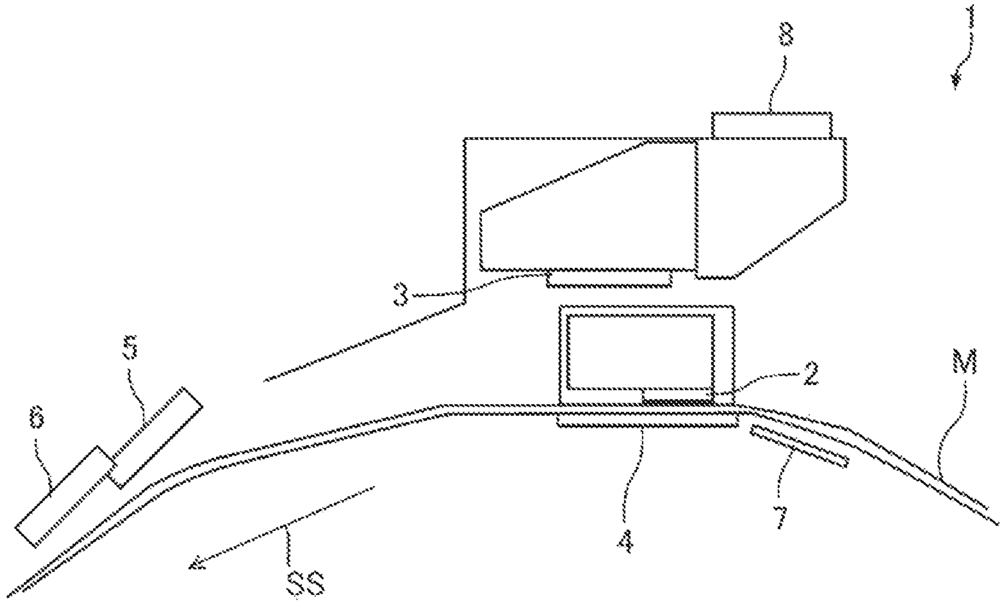
FIG. 1 is a schematic view of an example of an ink jet recording apparatus.

Embodiments of the present disclosure will now be described. The embodiments described below describe examples of the present disclosure. The present disclosure is not limited to the following embodiments in any way, and includes various modifications that may be implemented without departing from the gist of the present disclosure. In addition, not all of the configurations described below are essential configurations of the present disclosure.

1. INK SET

The ink set according to the present embodiment includes a process liquid, a first ink composition, and a second ink composition.

1.1. Process Liquid

1.1.1. Flocculant

The process liquid contains a flocculant that aggregates the components of an ink composition. A part of the components included in a first ink composition and a second ink composition (ink compositions) described below is subjected to the aggregation effect of the flocculant of the process liquid.

The flocculant has a function of acting on the dispersibility of the components, such as a pigment and a water-dispersible resin (resin particle), included in the ink composition and thereby aggregating at least one of dispersions thereof. The degree of aggregation of a dispersion by a flocculant differs depending on the flocculant and the target and can be regulated. Such aggregation effect can, for example, enhance the color development of an image and/or enhance the fixability of an image.

The flocculant is not particularly limited, and examples thereof include a metal salt, an acid, and a cationic compound. As the cationic compound, for example, a cationic resin (cationic polymer) or a cationic surfactant can be used. Among these flocculants, from the viewpoint of image quality, the metal salt may be a polyvalent metal salt, and the cationic compound may be cationic resin. Examples of the acid include an organic acid and an inorganic acid, and the acid may be an organic acid from the viewpoint of the component reliability. Accordingly, the flocculant may be selected from a cationic resin, an organic acid, and a polyvalent metal salt from the viewpoint of obtaining particularly excellent image quality, friction resistance, gloss, and so on.

The metal salt may be a polyvalent metal salt, a metal salt other than a polyvalent metal salt can also be used. Among these flocculants, from the viewpoint of excellent reactivity with components included in an ink, at least one selected from metal salts and organic acids may be used. Among the cationic compounds, a cationic resin may be used because it is easily soluble in the process liquid. In addition, a combination of a plurality of flocculants may be used.

A polyvalent metal salt is a compound constituted of a di- or higher valent metal ion and an anion. Examples of the di- or higher valent metal ion include ions of calcium, magnesium, copper, nickel, zinc, barium, aluminum, titanium, strontium, chromium, cobalt, and iron. Among these metal ions constituting polyvalent metal salts, the metal ion may be at least one of a calcium ion and a magnesium ion from the viewpoint of the excellent aggregation property of the components of an ink.

The anion constituting a polyvalent metal salt is an inorganic ion or an organic ion. That is, the polyvalent metal salt is constituted of an inorganic ion or organic ion and a polyvalent metal ion. Examples of the inorganic ion include a chlorine ion, a bromine ion, an iodine ion, a nitrate ion, a sulfate ion, and a hydroxide ion. Examples of the organic ion include organic acid ions such as a carboxylate ion.

The polyvalent metal compound may be an ionic polyvalent metal salt. In particular, when the polyvalent metal salt is a magnesium salt or a calcium salt, the stability of the process liquid becomes better. The counter ion of the polyvalent metal may be either an inorganic ion or an organic acid ion.

Specific examples of the polyvalent metal salt include calcium carbonate such as heavy-weight calcium carbonate and light-weight calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, aluminum lactate, and calcium formate. These polyvalent metal salts may be used alone or in combination of two or more. Among these metal salts, from the viewpoint of obtaining sufficient solubility in water, the polyvalent metal salt may be at least any one of magnesium sulfate, calcium nitrate, aluminum lactate, calcium propionate, calcium formate, and calcium lactate. These metal salts may include hydrated water in the raw material form.

Examples of the metal salt other than the polyvalent metal salt include monovalent metal salts such as a sodium salt and a potassium salt, for example, sodium sulfate and potassium sulfate.

Examples of the organic acid include poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidonecarboxylic acid, pyronecarboxylic acid, pyrrolecarboxylic acid, furancarboxylic acid, pyridinecarboxylic acid, coumaric acid, thiophenecarboxylic acid, and nicotinic acid, derivatives thereof, and salts thereof. The organic acids may be used alone or in combination of two or more. The salts of organic acids that are metal salts are included in the above metal salts.

Examples of the inorganic acid include sulfuric acid, hydrochloric acid, nitric acid, and phosphoric acid. The inorganic acids may be used alone or in combination of two or more.

Examples of the cationic resin (cationic polymer) include a cationic urethane resin, a cationic olefin resin, a cationic amine resin, and a cationic surfactant.

As the cationic urethane resin, a commercially available product can be used, and examples thereof include HYDRAN series CP-7010, CP-7020, CP-7030, CP-7040, CP-7050, CP-7060, and CP-7610 (trade name, manufactured by DIC Corporation), SUPERFLEX series 600, 610, 620, 630, 640, and 650 (trade name, manufactured by DKS Co., Ltd.), and urethane emulsion WBR-2120C and WBR-2122C (trade name, manufactured by Taisei Fine Chemical Co., Ltd.).

The cationic olefin resin includes olefin, such as ethylene or propylene, as the structure skeleton, and a known cationic olefin resin can be appropriately selected and used. The cationic olefin resin may be dispersed in a solvent such as water or an organic solvent into an emulsion form. As the cationic olefin resin, a commercially available product can be used, and examples thereof include ARROWBASE series CB-1200 and CD-1200 (trade name, manufactured by UNITIKA Ltd.).

As the cationic amine resin (cationic polymer), as long as an amino group is present in the structure, a known one can be appropriately selected and used, and examples thereof include a polyamine resin, a polyamide resin, and a polyallylamine resin. The polyamine resin is a resin having an amino group in the main skeleton of the resin. The polyamide resin is a resin having an amide group in the main skeleton of the resin. The polyallylamine resin is a resin having a structure derived from an allyl group in the main skeleton of the resin.

Examples of the cationic polyamine resin include UNISENCE KHE103L (hexamethylenediamine/epichlorohydrin resin, pH of 1% aqueous solution: about 5.0, viscosity: 20 to 50 (mPa·s), aqueous solution having a solid content concentration of 50 mass %) and UNISENCE KHE104L (dimethylamine/epichlorohydrin resin, pH of 1% aqueous solution: about 7.0, viscosity: 1 to 10 (mPa·s), aqueous solution having a solid content concentration of 20 mass %) manufactured by SENKA Corporation. Furthermore, specific examples of commercially available products of the cationic polyamine resin include FL-14 (manufactured by SNF Co., Ltd.), ARAFIX series 100, 251S, 255, and 255LOX (manufactured by Arakawa Chemical Industries, Ltd.), DK-6810, 6853, and 6885, and WS-4010, 4011, 4020, 4024, 4027, and 4030 (manufactured by SEIKO PMC Corporation), Papiogen P-105 (manufactured by SENKA Corporation), Sumirez Resin series 650(30), 675A, 6615, and SLX-1 (manufactured by Taoka Chemical Co., Ltd.), Catiomaster (registered trademark) series PD-1, 7, 30, A, PDT-2, PE-10, PE-30, DT-EH, EPA-SK01, and TMHMDA-E (manufactured by Yokkaichi Chemical Co., Ltd.), and JETFIX series 36N, 38A, and 5052 (manufactured by Satoda Chemical Industrial Co., Ltd.).

Examples of the polyallylamine resin include polyallylamine hydrochloride, polyallylamineamide sulfate, an allylamine hydrochloride-diallylamine hydrochloride copolymer, an allylamine acetate-diallylamine acetate copolymer, an allylamine acetate-diallylamine acetate copolymer, an allylamine hydrochloride-dimethylallylamine hydrochloride copolymer, an allylamine-dimethylallylamine copolymer, polydiallylamine hydrochloride, polymethyldiallylamine hydrochloride, polymethyldiallylamineamide sulfate, polymethyldiallylamine acetate, polydiallyldimethylammonium chloride, a diallylamine acetate-sulfur dioxide copolymer, a diallylmethylethylammoniumethyl sulfate-sulfur dioxide copolymer, a methyldiallylamine hydrochloride-sulfur dioxide copolymer, a diallyldimethylammonium chloride-sulfur dioxide copolymer, and a diallyldimethylammonium chloride-acrylamide copolymer.

Examples of the cationic surfactant include primary, secondary, and tertiary amine salt compounds, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, and an imidazolinium salt. Specifically, examples of the cationic surfactant include hydrochlorides or acetates of laurylamine, coconutamine, and rosinamine; lauryltrimethylammonium chloride, cetyltrimethylammonium chloride, benzyltributylammonoium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammmonium chloride. The cationic surfactant functions as a flocculant described below, but may be contained in an ink composition. However, the cationic surfactant may be contained in the process liquid as a flocculant.

A plurality of these flocculants may be used. In addition, since better aggregation effect is obtained by selecting at least one of a polyvalent metal salt, an organic acid, and a cationic resin among these flocculants, it is possible to form an image with higher image quality (in particular, good in color development).

In the process liquid, the total content of the flocculant is, for example, 0.1 mass % or more and 20 mass % or less based on the total mass of the process liquid, and may be 1 mass % or more and 20 mass % or less or 2 mass % or more and 15 mass % or less. Even when the flocculant is shared in a solution or dispersion, the content of the solid content may be within the above range. When the content of the flocculant is 1 mass % or more, the flocculant can sufficiently obtain the capacity of aggregating the components included in the ink. When the content of the flocculant is 30 mass % or less, the solubility and dispersibility of the flocculant in the process liquid are better to improve the storage stability and so on of the process liquid.

Even when the hydrophobicity of the organic solvent included in the process liquid is high, the solubility of the flocculant in 100 g of water at 25° C. may be 1 g or more and may be 3 g or more and 80 g or less, from the viewpoint of improving the solubility of the flocculant in the process liquid.

1.1.2. Other Components

The process liquid may contain, in addition to the flocculant, the following components.

1.1.2. (1) Water-Soluble Low Molecular Organic Compound

The process liquid may include a water-soluble low molecular organic compound. The water-soluble low molecular organic compound in this section does not include a color material, a polyvalent metal salt, an organic acid, and an organic amine. The water-soluble low molecular organic compound is mainly an organic solvent or a solid compound.

"Water-soluble" means that the solubility in 100 g of water at 20° C. is more than 10 g. Examples of the water-soluble low molecular organic compound include a compound that is liquid at ordinary temperature and a compound that is solid at ordinary temperature. The recovery from clogging of the process liquid and storage stability and image quality can be more improved by containing the water-soluble low molecular organic compound in the process liquid.

The solubility of a water-soluble low molecular organic compound is judged as follows. A predetermined amount of a water-soluble low molecular organic compound is mixed with 100 g of water under an environment of 20° C., and the mixture is stirred for 30 minutes. After the stirring, in the case of a compound that is liquid at ordinary temperature, when phase separation is not observed, it is judged to be soluble. In the case of a compound that is solid at ordinary temperature, when an undissolved residue is not observed, it is judged to be soluble.

Thus, when a predetermined amount of a compound is mixed with 100 g of water, the predetermined amount that is the largest amount among the predetermined amounts that are determined to have dissolved is defined as the solubility. A compound of which the solubility is more than 10 g is defined as a water-soluble low molecular organic compound. The water-soluble low molecular organic compound can be a compound that is completely miscible with water or a compound that is miscible with water.

In the present specification, "completely miscible with water" refers to that water and a compound dissolve into each other, that is, the solubility of the compound in 100 g of water at 20° C. is infinite. "Miscible with water" refers to that water and a compound have finite solubility and that the solubility of the compound in 100 g of water at 20° C. is more than 10 g. Although the solubility of the water-soluble low molecular organic compound is more than 10 g, the upper limit is not limited and may be infinite. The solubility may be 11 g or more or 50 g or more.

The water-soluble low molecular organic compound may have a molecular weight, as the weight average molecular weight, 500 or less, 400 or less, or 300 or less. The process liquid may include a water-soluble low molecular organic compound having a normal boiling point of 150° C. or more and 350° C. or less or 150° C. or more and 300° C. or less. In addition, the water-soluble low molecular organic compound may include a compound having a normal melting point of 90° C. or less or a normal melting point of 80° C. or less. The normal melting point may be −70° C. or more.

Examples of the water-soluble low molecular organic compound having a solubility in 100 g of water of more than 10 g at 20° C. include a resin-dissolving substance, a polyol, and a glycol ether. Examples of the resin-dissolving substance include amides, sulfur-containing solvents, and cyclic ethers. In particular, the water-soluble low molecular organic compound may be a resin-dissolving substance, a polyol, or a glycol ether.

Furthermore, examples of the water-soluble low molecular organic compound include amides, sulfur-containing solvents, and cyclic ethers each having a normal boiling point of 150° C. or more and 300° C. or less and polyols and glycol ethers each having a normal boiling point of 150° C. or more and 250° C. or less.

The amount of the water-soluble low molecular organic compound can be 40 mass % or less based on the total mass of the process liquid and can be 1 mass % or more and may be 5 mass % or more and 30 mass % or less or 10 mass % or more and 25 mass % or less.

When the process liquid includes a water-soluble low molecular organic compound having a normal boiling point of 250° C. or less, the content thereof may be 5 mass % or more and 30 mass % or less based on the total amount of the process liquid.

Resin-Dissolving Substance

Examples of the water-soluble low molecular organic compound having a solubility in 100 g of water of more than 10 g at 20° C. include a resin-dissolving substance that is any of an amide, a sulfur-containing solvent, and a cyclic ether. In particular, the process liquid may contain a resin-dissolving substance that is any of an amide, a sulfur-containing solvent, and a cyclic ether having a normal boiling point of 150° C. or more and 300° C. or less. The resin-dissolving substance is an organic compound having a function of dissolving a resin and improving abrasion resistance, but the function is not limited thereto.

Examples of the amide include cyclic amides (lactams) such as 2-pyrrolidone (2P), 2-piperidone, ε-caprolactam (CPL), N-methyl-ε-caprolactam, N-cyclohexyl-2-pyrrolidone, N-methylpyrrolidone, N-ethylpyrrolidone, N-butylpyrrolidone, 5-methyl-2-pyrrolidone, β-propiolactam, ω-heptalactam; and chain amides such as N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, N,N-dimethylpropionamide, 3-methoxy-N,N-dimethylpropanamide (DMPA), 3-n-butoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide. Among them, the amide may be any of 2-pyrrolidone (2P), ε-caprolactam (CPL), and 3-methoxy-N,N-dimethylpropanamide (DMPA), which tends to give the ink better storage stability.

Examples of the sulfur-containing solvent include 3-methylsulfolane, sulfolane, ethylisopropylsulfone, ethylmethylsulfone, dimethylsulfone, dimethylsulfoxide (DMSO), diethyl sulfoxide, tetramethylene sulfoxide, and methylphenyl sulfoxide. Among them, the sulfur-containing solvent may be dimethylsulfoxide (DMSO), which tends to give the ink better storage stability.

Examples of the cyclic ether include isosorbide dimethyl ether, 3-methyl-3-oxetanemethanol, 3-ethyl-3-oxetanemethanol (DMHD), 2-hydroxymethyloxetane, tetrahydrofurfuryl alcohol, solketal, glycerol formal, 1,4-dioxane-2,3-diol, and dihydrolevoglucosenone. Among them, the cyclic ether may be 3-ethyl-3-oxetanemethanol (DMHD), which tends to give the ink better storage stability.

Among these compounds, the resin-dissolving substance may be an amide having a normal boiling point of 150° C. or more and 300° C. or less, which tends to give better storage stability. The resin-dissolving substance may be a compound having a melting point of 80° C. or less. When the melting point is within the above range, the recovery from clogging tends to be excellent.

The process liquid may include the resin-dissolving substance that is any of an amide, a sulfur-containing solvent, and a cyclic ether as the water-soluble low molecular organic compound in an amount of 20 mass % or less based on the total mass of the process liquid, and the amount may be 15 mass % or less, 10 mass % or less, or 5 mass % or less. The lower limit may be 0 mass % or more, and the amount may be 1 mass % or more, 2 mass % or more, or 3 mass % or more.

The content of the resin-dissolving substance that is any of an amide, a sulfur-containing solvent, and a cyclic ether having a normal boiling point of 150° C. or more and 300° C. or less may be within the above range. When the content of these resin-dissolving substances is within the above range, the solubility of the resin in the process liquid is improved, and more excellent storage stability and friction resistance tend to be given. In contrast, when the content of these resin-dissolving substances exceeds the above range, the component reliability may decrease.

Polyols and Glycol Ethers

The process liquid may contain a compound that is any of a polyol and a glycol ether as a water-soluble low molecular organic compound other than the above-mentioned resin-dissolving substance. In particular, the process liquid may include the compound that is any of a polyol and a glycol ether having a normal boiling point of 150° C. or more and 250° C. or less.

Polyols

The polyol may be glycol or a compound in which glycol is intermolecularly condensed between hydroxy groups.

In this case, the compound has two hydroxy groups. Examples of the polyol include compounds in which a hydrogen atom in glycol or a compound in which glycol is intermolecularly condensed between hydroxy groups is substituted by a hydroxy group. In this case, the compound has three or more hydroxy groups.

The glycol or the glycol unit in the compound in which glycol is intermolecularly condensed between hydroxy groups constituting a polyol may have 2 or more and 10 or less of carbon atoms or 3 or more and 8 or less carbon atoms. The number of carbon atoms in a molecule of the polyol may be 2 or more and 15 or less or 3 or more and 10 or less. The polyol may have a normal boiling point of 150° C. or more and 250° C. or less.

Examples of the polyol having a normal boiling point of 150° C. or more and 250° C. or less include ethylene glycol (normal boiling point: 198° C., miscible with water), diethylene glycol (normal boiling point: 244° C., completely miscible with water), 1,2-propanediol (propylene glycol) (normal boiling point: 188° C., completely miscible with water), dipropylene glycol (normal boiling point: 227° C., completely miscible with water), 1,2-butanediol (normal boiling point: 193° C., miscible with water), 1,2-pentanediol (normal boiling point: 210° C., miscible with water), 1,2-hexanediol (normal boiling point: 224° C., completely miscible with water), 1,3-propanediol (normal boiling point: 214° C., completely miscible with water), 1,4-butanediol (normal boiling point: 228° C., completely miscible with water), 2,3-butanediol (normal boiling point: 177° C., miscible with water), 1,3-butylene glycol (normal boiling point: 207° C., completely miscible with water), 3-methyl-1,3-butanediol (normal boiling point: 203° C., completely miscible with water), 2-methyl-1,3-propanediol (normal boiling point: 214° C., completely miscible with water), 2,2-dimethyl-1,3-propanediol (normal boiling point: 208° C., solubility: 83 [g/100 g water]), 2-methylpentane-2,4-diol (normal boiling point: 197° C., completely miscible with water), 2,5-dimethyl-2,5-hexanediol (normal boiling point: 218° C., solubility: 14 [g/100 g water]), 1,5-pentanediol (normal boiling point: 242° C., miscible with water), 3-methyl-1,5-pentanediol (normal boiling point: 250° C., completely miscible with water), and 1,6-hexanediol (normal boiling point: 250° C., miscible with water). The polyol may be a polyol having 10 or less carbon atoms.

The polyol may be an alkanediol having a normal boiling point of 150° C. or more and 250° C. or less and having 10 or less carbon atoms or an alkanediol having a normal boiling point of 150° C. or more and 250° C. or less and having 6 or less carbon atoms. Examples of the alkanediol include 1,2-alkanediols, such as ethylene glycol, propylene glycol, 1,2-propanediol, 1,2-butanediol, 1,2-pentanediol, and 1,2-hexanediol; and 1,3-propanediol and 1,3-butylene glycol.

The process liquid may include an alkanediol having a normal boiling point of 150° C. or more and 250° C. or less and having 6 or less carbon atoms as the water-soluble low molecular organic compound in an amount of 1 mass % or more and 25 mass % or less based on the total mass of the process liquid.

Regarding Polyols with a Normal Boiling Point of Higher than 280° C.

The process liquid may include a polyol having a normal boiling point of higher than 280° C. as the water-soluble low molecular organic compound in an amount greater than 3 mass % based on the total mass of the process liquid. The amount may be 1 mass % or less or 0.5 mass % or less.

In this case, the process liquid may include or not a polyol having a normal boiling point of higher than 280° C. Even when including, the content is less than the above-mentioned content. If the content of the polyol having a normal boiling point of higher than 280° C. is within the above range, the drying property of the process liquid can be prevented from decreasing significantly. As a result, even when recording is performed on a low-absorptive or non-absorptive recording medium, deterioration of fixability of an image tends to be suppressed. In addition, even when the temperature of the recording medium during heating and drying is relatively low, sufficient drying is possible. Examples of the polymer having a normal boiling point of higher than 280° C. include glycerin (normal boiling point: 290° C.) and does not include alkanolamines such as triisopropanolamine.

Glycol Ethers

The glycol ether is a compound in which one or more hydroxy groups of glycol are etherified. The glycol ether may be a monoether or diether of alkylene glycol. The etherified ether may be an alkyl ether. The alkylene of alkylene glycol and the alkyl of alkyl ether constituting glycol ethers may independently have 1 or more and 5 or less carbon atoms or 2 or more and 4 or less carbon atoms. The glycol ethers also may have a normal boiling point of 150° C. or more and 250° C. or less.

Examples of the glycol ether include alkylene glycol monoalkyl ethers, such as ethylene glycol monomethyl ether (completely miscible with water), ethylene glycol monoethyl ether (miscible with water), ethylene glycol monoisopropyl ether (solubility: 100 [g/100 g water]), ethylene glycol monopropyl ether (miscible with water), ethylene glycol monoisobutyl ether (solubility: 75.5 [g/100 g water]), ethylene glycol mono-tert-butyl ether (miscible with water), ethylene glycol monobutyl ether (solubility: 100 [g/100 g water]), diethylene glycol monomethyl ether (completely miscible with water), diethylene glycol monoethyl ether (completely miscible with water), diethylene glycol monoisopropyl ether (miscible with water), diethylene glycol monoisobutyl ether (completely miscible with water), diethylene glycol monobutyl ether (completely miscible with water), triethylene glycol monomethyl ether (completely miscible with water), triethylene glycol monoethyl ether (completely miscible with water), triethylene glycol monobutyl ether (miscible with water), tetraethylene glycol monomethyl ether (miscible with water), propylene glycol monomethyl ether (miscible with water), propylene glycol monoethyl ether (completely miscible with water), propylene glycol monopropyl ether (miscible with water), dipropylene glycol monomethyl ether (completely miscible with water), dipropylene glycol monopropyl ether (solubility: 19 [g/100 g water]), tripropylene glycol monomethyl ether (completely miscible with water), 1,3-propanediol monomethyl ether (3-methoxy-1-propanol) (completely miscible with water), and 1,3-butylene glycol-3-monomethyl ether (3-methoxy-1-butanol) (miscible with water); and alkylene glycol dialkyl ethers, such as ethylene glycol dimethyl ether (glyme) (completely miscible with water), diethylene glycol dimethyl ether (completely miscible with water), diethylene glycol methyl ethyl ether (completely miscible with water), diethylene glycol diethyl ether (completely miscible with water), triethylene glycol dimethyl ether (completely miscible with water), tetraethylene glycol dimethyl ether (completely miscible with water), dipropylene glycol dimethyl ether (solubility: 52.6 [g/100 g water]), and tripropylene glycol dimethyl ether (solubility: 23.6 [g/100 g water]).

The glycol ether may be monoether, which has better component reliability than ether.

The process liquid may include any of a polyol and a glycol ether as the water-soluble low molecular organic compound in an amount of 30 mass % or less or 25 mass % or less based on the total mass of the process liquid. The lower limit is 0 mass % or more based on the total mass of the process liquid, and the amount may be 10 mass % or more or 15 mass % or more.

The content of any of a polyol and a glycol ether having a normal boiling point of 150° C. to 250° C. may be within the above range.

When the content of these water-soluble low molecular organic compounds is within the above range, the solubility of the resin is more improved, and more excellent storage stability tends to be given.

1.1.2. (2) Surfactant

The process liquid may contain a surfactant. The surfactant is not particularly limited, and examples thereof include an acetylene glycol-based surfactant, a fluorine-based surfactant, and a silicone-based surfactant.

The acetylene glycol-based surfactant is not particularly limited, and examples thereof include SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all of which are trade names, manufactured by Air Products Japan, K.K.), OLFINE series B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all of which are trade names, manufactured by Nissin Chemical Industry Co., Ltd.), and ACETYLENOL series E00, E00P, E40, and E100 (all of which are trade names, manufactured by KAWAKEN Fine Chemicals Co., Ltd.).

The fluorine-based surfactant may be a fluorine modified polymer, and examples thereof include BYK-340 (trade name, manufactured by BYK Japan K.K.).

The silicone-based surfactant is not particularly limited, and examples thereof include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (which are trade names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are trade names, manufactured by Shin-Etsu Chemical Co., Ltd.), and SILFACE SAG503A and SILFACE SAG014 (which are trade names, manufactured by Nissin Chemical Industry Co., Ltd.).

The surfactants above may be used alone or in combination of two or more.

When the process liquid contains a surfactant, the content may be 0.1 mass % or more and 1.5 mass % or less based on the total mass of the process liquid.

Among the above surfactants, the content of the silicone-based surfactant or the fluorine-based surfactant may be within the above range. Furthermore, among the above surfactants, the content of the silicone-based surfactant may be within the above range.

In general, when the process liquid contains a silicone-based surfactant, the image quality tends to be more improved, but the friction resistance and defoaming property tend to deteriorate. However, in the process liquid of the present embodiment, even in an addition amount within the above range, it is possible to give excellent image quality and also good friction resistance.

1.1.2. (3) Other Additives

The process liquid may contain various additives, such as a chelating agent, a rust inhibitor, an anti-mold agent, an antioxidant, a reduction inhibitor, and an evaporation accelerator, as needed.

1.1.3. Physical Properties and Manufacturing of Process Liquid

The process liquid may have a surface tension (static surface tension) of 18 mN/m or more and 40 mN/m or less at 20° C. from the viewpoint of more enhancing the image quality of the ink jet ink. The surface tension may be 20 mN/m or more and 35 mN/m or less or 22 mN/m or more and 33 mN/m or less. The surface tension can be measured, for example, using an automatic surface tension meter CBVP-Z (trade name, manufactured by Kyowa Interface Science Co., Ltd.) by checking the surface tension when a platinum plate is wetted with the process liquid in an environment of 20° C.

From the same viewpoint, the viscosity of the process liquid at 20° C. may be 3 mPa·s or more and 10 mPa·s or less or 3 mPa·s or more and 8 mPa·s or less. The viscosity can be measured, for example, using a viscoelasticity tester MCR-300 (trade name, manufactured by Physica) by measuring the viscosity in an environment of 20° C.

The process liquid is obtained by mixing the above-described components in an arbitrary order and removing impurities by filtration or the like as needed. The method for mixing each component may be a method of adding the materials sequentially to a container equipped with a stirring device such as a mechanical stirrer or a magnetic stirrer and stirring and mixing them. The method for the filtration can be performed by, for example, centrifugal filtration or filter filtration as needed.

1.1.4. Application of Process Liquid

The process liquid is used together with an ink composition in recording. The process liquid may be used by being allowed to adhere in advance to the medium to which the ink composition adheres. Alternatively, the process liquid may be used as in an ink composition by being discharged from an ink jet head in recording. By doing so, the amount of the process liquid can be suppressed.

The process liquid constitutes an ink set together with an ink composition. That is, an ink set includes the process liquid and an ink composition. The ink set is a set of an ink and the process liquid that are used for recording in a set.

1.2. First Ink Composition

The first ink composition contains a color material, is a thick ink, and is an aqueous ink. The thick ink refers to an ink in which the content of the color material is 1.5 times or more higher than those of other inks and may be high 2.0 times or more, 3.0 times or more, or 4.0 times or more. The specific content of the color material in a thick ink can be, for example, 0.8 mass % or more based on the total amount of the thick ink and may be 1.0 mass % or more, 1.5 mass % or more, or 2.0 mass % or more.

1.2.1. Color Material

The first ink composition contains a color material. As the color material, at least one of a pigment and a dye can be used.

Pigment

As the pigment, any of an inorganic pigment and an organic pigment can be used. The color material may be a pigment because the light resistance of the first ink composition can be improved in some cases.

As the inorganic pigment, carbon black (C.I. Pigment Black 7), such as furnace black, lamp black, acetylene black, and channel black, iron oxide, or titanium oxide can be used.

Examples of the organic pigment include azo pigments, such as an insoluble azo pigment, a condensed azo pigment, an azo lake, and a chelate azo pigment; polycyclic pigments, such as a phthalocyanine pigment, perylene and perinone pigments, an anthraquinone pigment, a quinacridone pigment, a dioxane pigment, a thioindigo pigment, an isoindolinone pigment, and a quinophthalone pigment; dye chelates (e.g., a basic dye chelate and an acid dye chelate); dye lake (basic dye lake and acid dye lake); and a nitro pigment, a nitroso pigment, aniline black, and a daylight fluorescent pigment.

More specifically, examples of the carbon black that is used as a black ink include No. 2300, No. 900, MCF88, No. 33, No. 40, No. 45, No. 52, MA7, MA8, MA100, and No. 2200B (manufactured by Mitsubishi Chemical Corporation); and Raven 5750, Raven 5250, Raven 5000, Raven 3500, Raven 1255, and Raven 700 (manufactured by Columbia Carbon Co.).

Examples of the pigment that is used in a white ink include C.I. Pigment White 6, 18, and 21.

Examples of the pigment that is used in a yellow ink include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I.

Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, and C.I. Pigment Yellow 180.

Examples of the pigment that is used in a magenta ink include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50. The pigment may be a solid solution of two or more of the pigments above.

Examples of the pigment that is used in a cyan ink include C.I. Pigment Blue 1, C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of the pigment other than the magenta, cyan, and yellow inks include C.I. Pigment Green 7, C.I. Pigment Green 10, C.I. Pigment Green 36, C.I. Pigment Green 58, C.I. Pigment Brown 3, C.I. Pigment Brown 5, C.I. Pigment Brown 25, C.I. Pigment Brown 26, C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 63.

The above pigments may be used alone or in combination of two or more.

When a pigment is used in the first ink composition, the average particle diameter thereof can be 300 nm or less and may be 50 nm or more and 200 nm or less. When the average particle diameter is within the above range, the reliability of the first ink composition, such as the discharge stability and the dispersion stability, is further improved, and images with excellent image quality tend to be formed. Here, the average particle diameter in the present specification is measured by a dynamic light scattering.

Pigment Dispersion

The pigment may be present in a state of being dispersed in the first ink composition, i.e., present as a pigment dispersion. Here, the term "pigment dispersion" in the present specification is meant to include a pigment dispersion and a pigment slurry (low-viscosity aqueous dispersion).

Examples of the pigment dispersion include, but not limited to, a self-dispersed pigment, a polymer-dispersed pigment, and a polymer-coated pigment.

Self-Dispersed Pigment

The self-dispersed pigment is a pigment that can be dispersed or dissolved in an aqueous solvent without using a dispersant. Here, "being dispersed or dissolved in an aqueous solvent without using a dispersant" refers to a state of being stably present in an aqueous solvent by the hydrophilic group on the surface, even if a dispersant for dispersing the pigment is not used. Accordingly, there is almost no foaming due to a decrease in the defoaming property resulted from a dispersant, and therefore an ink having excellent discharge stability can be easily prepared. In addition, since a significant increase in viscosity resulting from a dispersant is prevented, handling is easy such that it is possible to contain a larger amount of the pigment and that it is possible to sufficiently increase the print concentration.

The hydrophilic group may be one or more hydrophilic groups selected from the group consisting of —OM, —COOM, —CO—, $—SO_3M$, $—SO_2M$, $—SO_2NH_2$, $—RSO_2M$, $—PO_3HM$, $—PO_3M_2$, $—SO_2NHCOR$, $—NH_3$, and $—NR_3$.

In these chemical formulae, M represents a hydrogen atom, an alkali metal, ammonium, an optionally substituted phenyl group, or organic ammonium, and R represents an alkyl group having 1 to 12 carbon atoms or an optionally substituted naphthyl group. The above M and R are each independently selected.

The self-dispersed pigment is manufactured by, for example, subjecting a pigment to physical treatment or chemical treatment to bind (graft) the hydrophilic group on the surface of the pigment. An example of the physical treatment is vacuum plasma treatment. Examples of the chemical treatment are a wet oxidation method by oxidation with an oxidant in water and a method of binding p-aminobenzoic acid to the pigment surface to bind a carboxy group through a phenyl group.

Polymer-Dispersed Pigment

The polymer-dispersed pigment is a pigment that is made dispersible by polymer dispersion. Examples of the polymer include, but not limited to, an acrylic acid resin, a maleic acid resin, and a urethane resin. The dispersion polymer that is used for dispersion of the pigment may have a glass transition temperature (Tg) of 80° C. or less or 75° C. or less. When the Tg is 80° C. or less, the fixability of the ink may be improved.

The above polymer may have a weight average molecular weight of 10000 or more and 200000 or less when measured by gel permeation chromatography (GPC). Consequently, the storage stability of the ink may be further improved. Here, the weight average molecular weight (Mw) in the present specification can be measured as a weight average molecular weight in terms of polystyrene by gel permeation chromatography (GPC) using L7100 system manufactured by Hitachi, Ltd.

The above polymer may be a polymer in which 70 mass % or more of the structural components are produced by copolymerization of (meth)acrylate and (meth)acrylic acid, because the fixability and glossiness of the ink tend to be further improved. The polymer may be one obtained by polymerization of monomer components of which 70 mass % or more is at least one of alkyl (meth)acrylate having 1 to 24 carbon atoms and cyclic alkyl (meth)acrylate having 3 to 24 carbon atoms. Examples of the monomer component include, but not limited to, methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth) acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth) acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. As other monomer components for polymerization, hydroxy (meth)acrylate, urethane (meth) acrylate, and epoxy (meth)acrylate having a hydroxyl group, such as hydroxyethyl (meth)acrylate, hydroxypropyl (meth) acrylate, and diethylene glycol (meth)acrylate can be used.

In the present specification, the expression of (meth) acrylic means at least one of acrylic and methacrylic. The expression of (meth)acrylate means at least one of acrylate and methacrylate.

Polymer-Coated Pigment

Among the polymer-dispersed pigments, since the fixability, glossiness, and color reproductivity of the ink tend to be excellent, the polymer-coated pigment, i.e., a microencapsulated pigment may be used.

The polymer-coated pigment is a pigment obtained by a phase inversion emulsification method. That is, the polymer is dissolved in an organic solvent, such as methanol, ethanol, isopropanol, n-butanol, acetone, methyl ethyl ketone, and dibutyl ether. A pigment is added to the obtained solution, and a neutralizer and water are then added thereto, followed by kneading and dispersing to prepare an oil-in-water dispersion. The organic solvent is then removed from the obtained dispersion to obtain a polymer-coated pigment as a water dispersion. The kneading and dispersing can be performed by using, for example, a ball mill, a roll mill, a bead mill, a high-pressure homogenizer, or a high-speed stirrer disperser.

The neutralizer may be ethylamine, tertiary amine such as trimethylamine, lithium hydroxide, sodium hydroxide, potassium hydroxide, or ammonia. The obtained water dispersion may have a pH of 6 to 10.

The polymer coating the pigment may have a weight average molecular weight of about 10000 or more and 150000 or less when measured by GPC, from the viewpoint of stably dispersing the pigment.

Dye

The dye is not particularly limited, and an acid dye, a direct dye, a reactive dye, or a basic dye can be used. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The above dyes may be used alone or in combination of two or more.

The content of the color material (solid content) may be, for example, 1 mass % or more based on the total mass of the first ink composition and may be 2 mass % or more or 3 mass % or more. The content of the color material (solid content) may be 10 mass % or less based on the total mass of the first ink composition and may be 8 mass % or less, or 6 mass % or less. The content may be 5 mass % or more. When the content of the color material is within the above range, the storage stability may be more improved.

1.2.2. Water

The first ink composition is an aqueous ink and contains water. An "aqueous" composition is a composition of which one of main solvents is water. The water is the same as that described in the section of the process liquid, and the description thereof will be omitted.

1.2.3. Other Components 1.2.3. (1) Water-Soluble Low Molecular Organic Compound

The first ink composition may contain a water-soluble low molecular organic compound. When the first ink composition contains a water-soluble low molecular organic compound, the recovery from clogging, storage stability, image quality, and so on of the ink can be easily improved. Examples of the water-soluble low molecular organic compound are the same as those described in the section of the process liquid, and the description thereof will be omitted. The content of the water-soluble low molecular organic compound in the ink may be 0.5 mass % or more and 40 mass % or less, 1 mass % or more or more and 30 mass % or less, or 5 mass % or more and 20 mass % or less.

1.2.3. (2) Surfactant

The first ink composition may contain a surfactant. Examples of the surfactant are the same as those described in the section of the process liquid, and the description thereof will be omitted.

1.2.3. (3) Water-Dispersible Resin

The first ink composition may include a water-dispersible resin (also called a resin particle or a resin emulsion). The water-dispersible resin functions as a so-called fixing resin that improves the adhesion of, for example, a component of the first ink composition adhered to a recording medium. Examples of the water-dispersible resin include a urethane resin, an acrylic resin (including styrene acrylic resin), a fluorene resin, an olefin resin, a rosin-modified resin, a terpene resin, an ester resin, an amide resin, an epoxy resin, a vinyl chloride resin, a vinyl chloride-vinyl acetate copolymer, and an ethylene vinyl acetate resin. These water-dispersible resins may be in a particulate form or resin particles, and are often handled in the form of an emulsion. These water-dispersible resins may be in a powder form. The water-dispersible resins can be used alone or in combination of two or more.

The urethane resin is a generic term for resins having urethane bonds. As the urethane resin, it is possible to use a polyether urethane resin including an ether bond in the main chain in addition to the urethane bond, a polyester urethane resin including an ester bond in the main chain in addition to the urethane bond, or a polycarbonate urethane resin including a carbonate bond in the main chain in addition to the urethane bond. The urethane resin as the water-dispersible resin may be a commercially available product, and examples thereof include Superflex series 460, 460s, 840, and E-4000 (trade name, manufactured by DKS Co., Ltd.), Rezamin series D-1060, D-2020, D-4080, D-4200, D-6300, and D-6455 (trade name, manufactured by Dainichiseika Color & Chemicals Mfg. Co., Ltd.), TAKELAC series WS-6021 and W-512-A-6 (trade name, manufactured by Mitsui Chemicals, Inc.), Sancure 2710 (trade name, manufactured by Lubrizol Corporation), and PERMARIN UA-150 (trade name, manufactured by Sanyo Chemical Industries, Ltd.).

The acrylic resin is a generic term for polymers that are obtained by polymerizing at least an acrylic monomer, such as (meth)acrylic acid and (meth)acrylic ester, as one component, and examples thereof include a resin obtained from an acrylic monomer and a copolymer of an acrylic monomer and a monomer other than the acrylic monomer, such as an acrylic-vinyl resin which is a copolymer of an acrylic monomer and a vinyl monomer and a copolymer with a vinyl monomer such as styrene.

As the acrylic monomer, acrylamide, acrylonitrile, and so on can also be used. Examples of the commercially available product of the water-dispersible resin of which the raw material is an acrylic resin include FK-854 (trade name, manufactured by Chuo Rika Kogyo Co., Ltd.), Movinyl series 952B and 718A (trade name, manufactured by The Nippon Synthetic Chemical Industry Co., Ltd.), and Nipol series LX852 and LX874 (trade name, manufactured by Zeon Corporation).

In particular, the styrene acrylic resin is a copolymer that is obtained from a styrene monomer and an acrylic monomer, and examples thereof include a styrene-acrylic acid copolymer, a styrene-methacrylic acid copolymer, a styrene-methacrylic acid-acrylic ester copolymer, a styrene-α-methylstyrene-acrylic acid copolymer, and a styrene-α-methylstyrene-acrylic acid-acrylic ester copolymer. The water-dispersible resin of the styrene acrylic resin may be a commercially available product, and examples thereof include JONCRYL series 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF), Movinyl series 966A and 975N (trade name, manufactured by The Nippon Synthetic Chemical Industry Co., Ltd.), and Vinyblan 2586 (manufactured by Nissin Chemical Industry Co., Ltd.).

The olefin resin has a structure derived from olefin such as ethylene, propylene, and butylene, and a known olefin resin can be appropriately selected and used. As the water-dispersible resin of the olefin resin, a commercially available product can be used, and examples thereof include ARROWBASE series CB-1200 and CD-1200 (trade name, manufactured by UNITIKA Ltd.).

Other examples of the commercially available product of the emulsion of the water-dispersible resin include Microgel series E-1002 and E-5002 (trade name, manufactured by Nippon Paint Co., Ltd., styrene-acrylic resin emulsion), Voncoat 4001 (trade name, manufactured by DIC Corporation, acrylic resin emulsion), Voncoat 5454 (trade name, manufactured by DIC Corporation, styrene-acrylic resin emulsion), Polysol series AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol series AD-13, AD-2, AD-10, AD-96, AD-17, and AD-70 (ethylene-vinyl acetate resin emulsion), Polysol PSASE-6010 (ethylene-vinyl acetate resin emulsion) (trade name, manufactured by Resonac Corporation), Polysol SAE1014 (trade name, styrene-acrylic resin emulsion, manufactured by Zeon Corporation), Saivinol SK-200 (trade name, acrylic resin emulsion, manufactured by Saiden Chemical Industry Co., Ltd.), AE-120A (trade name, manufactured by JSR Corporation, acrylic resin emulsion), AE373D (trade name, manufactured by Emulsion Technology Co., Ltd., carboxy-modified styrene-acrylic resin emulsion), Seikadyne 1900W (trade name, manufactured by Dainichiseika Color & Chemicals Mfg. Co., Ltd., ethylene-vinyl acetate resin emulsion), Vinyblan 2682 (acrylic resin emulsion), Vinyblan 2886 (vinyl acetate-acrylic resin emulsion), Vinyblan 5202 (acrylic acetate resin emulsion) (trade name, manufactured by Nissin Chemical Industry Co., Ltd.), Elitel series KA-5071S, KT-8803, KT-9204, KT-8701, KT-8904, and KT-0507 (trade name, manufactured by Unitika Ltd., polyester resin emulsion), Hitec SN-2002 (trade name, manufactured by TOHO Chemical Industry Co., Ltd., polyester resin emulsion), TAKELAC series W-6020, W-635, W-6061, W-605, W-635, and W-6021 (trade name, manufactured by Mitsui Chemicals, Inc., urethane resin emulsion), Superflex series 870, 800, 150, 420, 460, 470, 610, and 700 (trade name, manufactured by DKS Co., Ltd., urethane resin emulsion), PERMARIN UA-150 (manufactured by Sanyo Chemical Industries, Ltd., urethane resin emulsion), Sancure 2710 (manufactured by The Lubrizol Corporation, urethane resin emulsion), NeoRez series R-9660, R-9637, and R-940 (manufactured by Kusumoto Chemicals, Ltd., urethane resin emulsion), ADEKA BONTIGHTER HUX series 380 and 290K (manufactured by ADEKA Corporation, urethane resin emulsion), Movinyl 966A and Movinyl 7320 (manufactured by The Nippon Synthetic Chemical Industry Co., Ltd.), JONCRYL series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (which are manufactured by BASF), NK Binder R-5HN (manufactured by Shin-Nakamura Chemical Co., Ltd.), HYDRAN WLS-210 (non-crosslinkable polyurethane: manufactured by DIC Corporation), and JONCRYL 7610 (manufactured by BASF).

When the first ink composition contains the water-dispersible resin, the content thereof may be, as the solid content, 10 mass % or less based on the total mass of the first ink composition and may be 7 mass % or less or 5 mass % or less. By doing so, an image with sufficiently good rubbing fastness can be recorded.

When the first ink composition includes a water-dispersible resin as the resin, the water-dispersible resin may have a glass transition temperature (Tg) of 40° C. or more, 50° C. or more, or 55° C. or more, and the glass transition temperature (Tg) may be 100° C. or less, 90° C. or less, or 80° C. or less. When the glass transition temperature is within the above range, an image with better rubbing fastness can be recorded. The glass transition temperature can be verified by differential scanning calorimetry (DSC).

When the first ink composition includes a water-dispersible resin in a particulate form as the resin, the particles of the water-dispersible resin may have a volume average particle diameter of 50 nm or more and 300 nm or less, 70 nm or more and 250 nm or less, or 100 nm or more and 200 nm or less. When the volume average particle diameter is within the above range, it is possible to perform recording with more excellent discharge stability. The volume average particle diameter of the particle of a water-dispersible resin can be verified as in the volume average particle diameter of a pigment.

The water-dispersible resin may show an aggregation property by the effect of the flocculant, such as calcium propionate, described later depending on the skeleton and properties of the functional group of the resin constituting the particle. In the ink set of the present embodiment, the water-dispersible resin need not have an aggregation property when mixed with a calcium propionate aqueous solution. When the water-dispersible resin does not have an aggregation property, the image is likely to have good friction resistance, even if the water-dispersible resin does not have an aggregation property, an image with sufficient image quality can be obtained by the ink set of the present embodiment by the aggregation property of a maleic acid resin described later.

Having an aggregation property is a case of being judged that the reactivity is good or is present when evaluated by the method for evaluating the aggregation property in Examples described later. Not having an aggregation property is a case of being judged that the reactivity is not present when evaluated by the same evaluation method.

The water-dispersible resin may be any of an acrylic resin including a styrene acrylic resin, a urethane resin, a polyester resin, and a polyolefin resin.

Although the water-dispersible resin may be an acrylic resin, when a silicone acrylic resin and a urethane resin are used in combination, the friction resistance of the image tends to be further improved. However, in such a case, since the recovery from clogging may be decreased, the amount of the urethane resin may be 1 mass % or less based on the total amount of the first ink composition.

The glass transition temperature (Tg) of the water-dispersible resin may be 60° C. or more, 70° C. or more, 80° C. or more, or 90° C. or more, and the glass transition temperature (Tg) may be 120° C. or less, 115° C. or less, 110° C. or less, or 105° C. or less. When the glass transition temperature (Tg) of the water-dispersible resin is withing the above range, banding unevenness may be more decreased, and the friction resistance may be more improved. The glass transition temperature (Tg) of the water-dispersible resin can be verified by an ordinary method using differential scanning calorimetry (DSC) or the like.

When the water-dispersible resin is used, the content of the water-dispersible resin may be, as the solid content, 0.1 mass % or more and 20 mass % or less based on the total mass of the first ink composition and may be 1.0 mass % or more and 15.0 mass % or less, 2.0 mass % or more and 10.0 mass % or less, or 3.0 mass % or more and 8.0 mass % or less. When the content of the water-dispersible resin in the first ink composition is within this range, the friction resistance of the image obtained by the ink set can be further improved.

1.2.3. (4) Water-Soluble Resin

The first ink composition may include a water-soluble resin. Examples of the water-soluble resin include a maleic acid resin, an acrylic acid resin, and a urethane resin.

When an ink contains a pigment dispersed with a pigment dispersant, the water-soluble resin is contained in the ink separately from the pigment dispersant.

The water-soluble resin is a resin having a solubility of more than 10 g in 100 g of water at 20° C. when the solubility is judged by the following method.

The solubility is determined as follows. A resin is dried at 105° C. for 2 hours, and a predetermined amount of the resin reached a constant weight is dissolved in 100 g of water of 20° C., followed by stirring for 30 minutes. After the stirring, when an undissolved residue is not observed, it is judged to be soluble. Thus, when a predetermined amount of a resin is mixed with 100 g of water at 20° C., the predetermined amount that is the largest amount among the predetermined amounts that are judged to be soluble is defined as the solubility.

The maleic acid resin is a polymeric compound having a structure derived from a maleic acid compound. Examples of the maleic acid compound include compounds having a structure in which one carboxy group is bonded to each of the adjacent carbon atoms bound by a carbon-carbon double bond of ethylene and derivative compounds thereof.

Examples of the maleic acid compound include maleic acid, maleic anhydride, fumaric acid, citraconic acid, citraconic anhydride, and mesaconic acid. The maleic acid compound may be a product of cyclodehydration or esterification of the carboxy groups bonded, respectively, to the adjacent carbon atoms. A carboxy group forming a salt is also included in the carboxy group.

Examples of the derivative include those in which the carboxy groups are derived as above and those in which the ethylene skeleton further includes a substituent.

In particular, the maleic acid compound may be maleic acid or a derivative of the carboxy group of maleic acid.

The maleic acid resin may be a product of cyclodehydration or esterification of the carboxy group derived from a maleic acid compound. A carboxy group forming a salt is also included in the carboxy group.

The polymeric compound having a structure derived from a maleic acid compound can be a polymeric compound obtained by polymerization or copolymerization at least using a maleic acid compound.

The maleic acid resin may be a polymer of a maleic acid compound or a copolymer of a maleic acid compound and another monomer. Examples of the monomer in this case include a vinyl monomer such as styrene, vinylnaphthalene, or vinyl acetate and an acrylic monomer such as ester of (meth)acrylic acid or (meth)acrylic acid.

The maleic acid resin has a structure derived from a maleic acid compound and has a carboxy group or a structure derived from a carboxy group on adjacent carbon atoms. Here, for example, in a polymer of acrylic acid polymerized by a generally known method, the polymerization is so-called head to tail polymerization. Accordingly, it is statistically rare for carboxy groups to be placed on adjacent carbon atoms. Accordingly, in a polymer of an acrylic acid compound, it is rare for carboxy groups to be adjacently arranged on a carbon chain of the main chain in the polymer, compared to polymerization of a maleic acid compound. Consequently, it is possible to verify whether adjacent carboxy groups are derived from a maleic acid compound or not, by, for example, NMR (nuclear magnetic resonance method).

The carboxy group of the maleic acid resin may be an esterification product, for example, a product of esterification by a compound having a hydroxy group. Two carboxy groups of a structure derived from a maleic acid compound need not be esterified, one of the carboxy groups may be esterified, or the both may be esterified.

When the carboxy group of a structure derived from a maleic acid compound is not esterified, the carboxy group may be present as carboxylic acid in an aqueous first ink composition or may be partially or completely neutralized with ammonia, alkanol amine, or alkylamine.

The maleic acid resin includes many structures derived from carboxy groups of a maleic acid compound and therefore has water solubility. Accordingly, the molecular chain of the maleic acid resin spreads out in an aqueous first ink composition. Consequently, when the first ink composition and the process liquid are mixed, the probability that the maleic acid resin encounters the flocculant increases. Accordingly, the maleic acid resin has a good aggregation property. Consequently, the image quality of the image obtained using the ink set can be enhanced.

When one of the two carboxy groups of a structure derived from the maleic acid compound of a maleic acid resin is esterified, the water resistance of the obtained image tends to be improved. When the two carboxy groups of a structure derived from the maleic acid compound are not esterified, the water resistance of the obtained image tends to decrease. The balance between the hydrophilicity and hydrophobicity of the maleic acid resin can be controlled by the degree of esterification. Consequently, the storage stability of the first ink composition can be more improved, and the water resistance of the obtained image can be further improved. For example, the maleic acid compound may be a styrene-maleic anhydride half-ester copolymer salt from the viewpoint of the balance between the hydrophilicity and hydrophobicity. It is inferred that this is because the esterified carboxy group has high hydrophobicity to promote insolubilization during reaction and solid-liquid separation.

It is inferred that when the maleic acid resin includes a structure derived from maleic anhydride, the anhydride becomes a carboxy group in water by hydration.

The maleic acid resin is a water-soluble resin and may be present as a solution dissolved in water as the solvent component of the ink, for example, without attaching to the pigment in the first ink composition. Consequently, an excellent aggregation property is given.

The maleic acid resin shows an aggregation property by the effect of the flocculant such as calcium propionate described later, depending on the skeleton of the resin constituting the particle and the number and properties of functional group. In the ink set of the present embodiment, the maleic acid resin has an aggregation property when mixed with a calcium propionate aqueous solution. An image with sufficient image quality can be obtained by the ink set of the present embodiment due to the aggregation property of the maleic acid resin. From such a viewpoint, the ratio between the content of the water-dispersible resin and the content of the maleic acid resin may be as described later.

The maleic acid resin may include an acidic group such as a carboxy group, a sulfonate group, and a phosphate group. That is, the carboxy group derived from a maleic acid compound may be present in an acid or salt form, and even when all the carboxy groups derived from a maleic acid compound are esterified, the skeleton or the ester group may include an acidic group such as a carboxy group, a sulfonate group, and a phosphate group in an acid or salt form. The acidic group may be partially or completely neutralized with ammonia, alkanol amine, or alkylamine.

According to such a maleic acid resin, since the aggregation property is more improved, the image quantity of the obtained image can be further enhanced. According to this ink set, since the dissolution of the maleic acid resin becomes more stable, the storage stability of the first ink composition can be more improved.

The maleic acid resin may have a weight average molecular weight of 1000 or more and 100000 or less, 5000 or more and 60000 or less, or 10000 or more and 50000 or less. When the weight average molecular weight is withing this range, suppression of the aggregation unevenness in the obtained image and improvement of the friction resistance can be further enhanced. The stability of the discharge from an ink jet head is also improved.

Examples of commercially available product of the maleic acid resin include SN Dispersant series 5027 and 5029 (which are manufactured by SAN NOPCO Ltd.), SANSPARL PS-8 (manufactured by Sanyo Chemical Industries, Ltd.), MALIALIM series HKM-50A, 150A, AKM-0531, and SC-0505K and POLYSTAR OMA (which are manufactured by NOF Corporation), Demol series P, EP, and ST and Poiz series 520 and 521 (which are manufactured by Kao Corporation), POLITY A550 (manufactured by Lion Corporation), ARASTAR 703S and POLYMARON series 1318, 351T, 385, 372, 375CB, 482, 482S, and 1329 (which are manufactured by Arakawa Chemical Industries, Ltd.), XIRAN series 1440H, 2625H, 1000H, 2000H, and 3000H (which are manufactured by Polyscope), ISOBAM-104 (manufactured by Kuraray Co., Ltd.), and FLOWLEN series G-700AMP and G-700DMEA (which are manufactured by Kyoeisha Chemical Co., Ltd.).

Examples of the water-soluble acrylic acid resin include compounds having a structure derived from an acrylic acid monomer, such as poly(meth)acrylic acid and derivatives thereof, and having water solubility, specifically, Poiz series manufactured by Kao Corporation, Acumer series and Acusol series manufactured by The Dow Chemical Company, Aqualic series manufactured by Nippon Shokubai Co., Ltd., Aron series and Jurymer series manufactured by Toagosei Co., Ltd., and Sokalan series manufactured by BASF.

The acrylic acid resin may have a weight average molecular weight of 1000 or more and 100000 or less, 5000 or more and 60000 or less, or 10000 or more and 50000 or less. When the weight average molecular weight is within this range, suppression of the aggregation unevenness in the obtained image and improvement of the friction resistance can be further enhanced. The stability of the discharge from an ink jet head is also improved.

Examples of the water-soluble urethane resin include resins including units derived respectively from polyisocyanate, polyol not having an acid group, and polyol having an acid group. The urethane resin may further include a unit derived from polyamine.

Polyisocyanate

The polyisocyanate is a compound having two or more isocyanate groups in its molecular structure. Examples of the polyisocyanate include an aliphatic polyisocyanate and an aromatic polyisocyanate.

Examples of the aliphatic polyisocyanate include polyisocyanates having a chain structure, such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl) cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha',\alpha'$-tetramethylxylylene diisocyanate.

Polyol and Polyamine

The polyol is a compound having two or more hydroxyl groups in its molecular structure. Examples of the polyol include polyols not having an acid group, such as polyether polyol, polyester polyol, and polycarbonate polyol; and polyols having an acid group. The polyamine is a compound having two or more amino groups in its molecular structure. The proportion (mol %) of the units derived from the polyol and polyamine in the urethane resin may be 10.0 mol % or more and 80.0 mol % or less or 20.0 mol % or more and 60.0 mol % or less.

(1) Polyol not Having an Acid Group

Examples of the polyether polyol include addition polymers of alkylene oxides and polyols; and glycols such as (poly)alkylene glycol. Examples of the alkylene oxide include ethylene oxide, propylene oxide, butylene oxide, and α-olefin oxide. Examples of the polyol that is addition-polymerized with the alkylene oxide include diols, such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea, and derivatives thereof; and triols, such as glycerin, trimethylolpropane, 1,2,5-hexanetriol, 1,2,6-hexanetriol, pentaerythritol, trimethylolmelamine, and derivatives thereof, and polyoxypropylene triol. Examples of the glycol include (poly)alkylene glycols, such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, and (poly)tetramethylene glycol; and an ethylene glycol-propylene glycol copolymer.

Examples of the polyester polyol include acid ester. Examples of the acid component constituting the acid ester include aromatic dicarboxylic acids, such as phthalic acid, naphthalenedicarboxylic acid, biphenylcarboxylic acid, and tetrahydrophthalic acid; alicyclic dicarboxylic acids, such as hydrogenated products of the above aromatic dicarboxylic acids; and aliphatic dicarboxylic acids, such as malonic acid, succinic acid, tartaric acid, oxalic acid, glutaric acid, adipic acid, pimelic acid, suberic acid, azelaic acid, sebacic acid, alkylsuccinic acid, linoleic acid, maleic acid, fumaric acid, mesaconic acid, citraconic acid, and itaconic acid. Their anhydrides, salts, derivatives (alkyl ester and acid halide), and so on can also be used as the acid component. Examples of the component that forms ester with the acid component include polyols such as diol and triol; and glycols, such as (poly)alkylene glycol. Examples of the polyols and glycols include those exemplified as the component constituting the polyether polyol.

As the polycarbonate polyol, a polycarbonate polyol that is manufactured by a known method can be used, and examples thereof include alkanediol-based polycarbonate diol, such as polyhexamethylene carbonate diol, and also include polycarbonate diol that is obtained by reaction of a carbonate component, such as alkylene carbonate, diaryl carbonate, or dialkyl carbonate, or phosgene and an aliphatic diol component.

(2) Polyol Having an Acid Group

Examples of the polyol having an acid group include polyol having an acid group, such as a carboxylate group, a sulfonate group, a phosphate group, and a phosphonate group. The acid group may be a carboxylate group. Examples of the polyol having a carboxylate group include dimethylolacetic acid, dimethylolpropionic acid, dimethylolbutanoic acid, and dimethylolbutyric acid. The acid group of the polyol having an acid group may be in a salt form. Examples of the cation that forms a salt include ions of alkali metals such as lithium, sodium, and potassium; and an ammonium ion and cations of organic amine such as dimethylamine.

(3) Polyamine

Examples of the polyamine include a monoamine having a plurality of hydroxyl groups, such as dimethylolethylamine, diethanolmethylamine, dipropanolethylamine, and dibutanolmethylamine; a bifunctional polyamine, such as ethylenediamine, propylenediamine, hexylenediamine, isophoronediamine, xylylenediamine, diphenylmethanediamine, hydrogenated diphenylmethanediamine, and hydrazine; and a tri- or higher functional polyamine, such as diethylenetriamine, triethylenetetramine, tetraethylenepentamine, polyamide polyamine, and polyethylene polyimine.

Crosslinking Agent and Chain Extender

When the urethane resin is synthesized, s crosslinking agent and a chain extender can be used. In general, the crosslinking agent is used in the synthesis of a prepolymer, and the chain extender is used in the chain-growth reaction for the prepolymer synthesized in advance. Basically, the crosslinking agent and the chain extender can be appropriately selected from, for example, water, polyisocyanate, polyol, and polyamine and used according to the purpose such as crosslinking and chain extension. As the chain extender, an agent that can crosslink a urethane resin can also be used.

When the first ink composition contains the water-soluble resin, the total content thereof may be 0.05 mass % or more and 3.0 mass % or less based on the total amount of the first ink composition and may be 0.05 mass % or more and 2.5 mass % or less, 0.1 mass % or more and 1.5 mass % or less, 0.2 mass % or more and 1.0 mass % or less, or 0.2 mass % or more and 0.8 mass % or less. When the content is within this range, the effect of the flocculant in the process liquid is sufficiently noticeable by the ink set, and an image with high image quality can be formed.

The water-soluble resin may have a glass transition temperature (Tg) of 60° C. or more, 70° C. or more, 80° C. or more, or 90° C. or more. The glass transition temperature (Tg) may be 120° C. or less, 115° C. or less, 110° C. or less, or 105° C. or less. When the glass transition temperature (Tg) of the water-soluble resin is within the above range, the banding unevenness may be more reduced, and more excellent friction resistance may be obtained.

The glass transition temperature (Tg) of the water-soluble resin can be verified by an ordinary method using differential scanning calorimetry (DSC) or the like.

1.2.3. (5) Wax

The first ink composition may contain wax. Examples of the wax include wax that is dissolved in an ink and wax that is dispersed in an ink in a microparticle form, such as emulsion. When such wax is used, a recorded matter with more excellent friction resistance tends to be obtained. In particular, localization of the wax on the surface of an ink coating film on the recording medium, that is, on the interface between the air and the ink coating film tends to contribute to improvement of the friction resistance.

Such wax is not particularly limited, and examples thereof include ester wax of higher fatty acid and higher monovalent or divalent alcohol, paraffin wax, microcrystalline wax, polyolefin wax, and a mixture thereof.

Examples of the polyolefin wax include wax and a copolymer thereof manufactured from olefin, such as ethylene, propylene, and butylene, or a derivative thereof, specifically, polyethylene-based wax, polypropylene-based wax, and polybutylene-based wax. As the polyolefin wax, commercially available products can be used, specifically, for example, Nopcoat PEM17 (trade name, manufactured by SAN NOPCO Ltd.), CHEMIPEARL W4005 (trade name, manufactured by Mitsui Chemicals, Inc.), AQUACER 515 and AQUACER 593 (which are trade names, manufactured by BYK Japan K.K.), and Hitec E-6500 (manufactured by TOHO Chemical Industry Co., Ltd., polyethylene wax) can be used.

When wax is contained, the content thereof may be 0.1 mass % or more and 5 mass % or less based on the total mass of the first ink composition and may be 0.2 mass % or more and 4 mass % or less or 0.3 mass % or more and 3 mass % or less. When the content of the wax is within the above range, the friction resistance is improved, and the viscosity of the ink is maintained to be low, it tends to provide excellent discharge stability and recovery from clogging.

1.2.3. (6) other Materials

The first ink composition may contain various additives, such as a chelating agent, a rust inhibitor, an anti-mold agent, an antioxidant, a reduction inhibitor, and an evaporation accelerator, as needed.

1.2.4. Viscosity Increasing Rate

The first ink composition is subjected to the thickening effect and aggregation effect when brought into contact with the process liquid. Consequently, the color development and friction resistance of the formed image can be obtained. The degrees of thickening and aggregation of the first ink composition are not particularly limited and can be evaluated by the viscosity increasing rate defined below, and the range may be determined based on the evaluation.

The viscosity increasing rate of the first ink composition is given as the viscosity increasing rate when the first ink composition and a 5 mass % aqueous solution of calcium propionate are mixed at a mass ratio of "the former:the latter=10:1". That is, the viscosity increasing rate of the first ink composition is that when the first ink composition and a 5 mass % aqueous solution of calcium propionate are mixed at a mass ratio of "the first ink composition:the 5 mass % aqueous solution of calcium propionate=10:1". The viscosity increasing rate may be 2.0 times or more, 2.2 times or more, or 2.5 times or more.

When the viscosity increasing rate is thus controlled, the aggregation property of the component of the first ink composition is sufficiently obtained when the first ink composition comes into contact with the process liquid, and the image quality of the image formed by the first ink composition is more improved.

Here, regarding an increase in the viscosity of an ink when mixed with a 5 mass % aqueous solution of calcium propionate (test solution), the "viscosity increasing rate" is defined as follows. That is, an ink to be used and a 5 mass % aqueous solution of calcium propionate are mixed and stirred at a mass ratio of ink: 5 mass % aqueous solution of calcium propionate=10:1, and the viscosity increasing rate is the ratio (magnification) of the viscosity of the mixture solution after mixing to the viscosity of the ink before mixing is. The viscosity is measured at 20° C. Accordingly, the viscosity increasing rate is the magnification of the viscosity after mixing based on the viscosity before mixing. The viscosity increasing rate is, for example, 0.5 times or more and 10.0 times or less. The viscosity increasing rate may be less than 1.0 times and the viscosity may decrease, depending on the composition of the ink, and such a case is also called a viscosity increasing rate. The viscosity can be measured using a rheometer. For example, the value of a shear rate of 200 (1/s) can be adopted as the viscosity.

The upper limit of the viscosity increasing rate of the first ink composition is not limited, but may be 20 times or less, 10 times or less, 9 times or less, 8.5 times or less, or 8 times or less. When the viscosity increasing rate of the first ink composition is within the above range, the image quality, crack resistance, friction resistance, discharge stability, and so on are more improved.

The viscosity increasing rate of the first ink composition can be adjusted by adjusting mainly the type, content, and so on of the color material (including resin dispersant) and resin particle. In particular, the viscosity increasing rate can be easily adjusted by adjusting the type, content, and so on of the color material (including resin dispersant).

1.2.5. Manufacturing and Physical Properties

The first ink composition is obtained by mixing the above-described components in an arbitrary order and removing impurities by filtration or the like as needed. The method for mixing each component may be a method of adding the materials sequentially to a container equipped with a stirring device such as a mechanical stirrer or a magnetic stirrer and stirring and mixing them. The method for the filtration can be performed by, for example, centrifugal filtration or filter filtration as needed.

The first ink composition may have a surface tension (static surface tension) of 18 mN/m or more and 40 mN/m or less at 20° C. from the viewpoint of the balance between the image quality and the reliability as the ink for ink jet recording. The surface tension may be 20 mN/m or more and 35 mN/m or less or 22 mN/m or more and 33 mN/m or less. The surface tension can be measured, for example, using an automatic surface tension meter CBVP-Z (trade name, manufactured by Kyowa Interface Science Co., Ltd.) by checking the surface tension when a platinum plate is wetted with the ink in an environment of 20° C.

From the same viewpoint, the viscosity of the ink at 20° C. can be 3 mPa·s or more and 10 mPa·s or less and may be 3 mPa·s or more and 8 mPa·s or less. The viscosity can be measured, for example, using a viscoelasticity tester MCR-300 (trade name, manufactured by Physica) by measuring the viscosity in an environment of 20° C.

1.3. Second Ink Composition

The second ink composition contains a color material, the content of the color material being smaller than that of the color material in the first ink composition, is a thin ink in a similar color to that of the first ink composition, and is an aqueous ink. The thin ink refers to an ink in which the content of the color material is 1/1.5 times or less compared to other inks and may be low ½ times or less, ⅓ times or less, or ¼ times or less. The content of the color material in a thin ink is specifically, for example, 1.5 mass % or less based on the total amount of the thin ink and may be 1.0 mass % or less, 0.8 mass % or less, or 0.5 mass % or less.

The second ink composition is an ink in a similar color to that of the first ink composition. A similar color includes not only the same color but also colors with the same hue but different brightness and saturation. For example, C (cyan) and Lc (light cyan), M (magenta) and Lm (light magenta), and K (black), Lk (gray), and LLk (light gray) are respectively similar colors.

1.3.1. Color Material

The second ink composition includes a color material. The color material is the same as that in the first ink composition, and the detailed explanation thereof will be omitted.

The content of the color material (solid content) in the second ink composition may be, for example, 1 mass % or less based on the total mass of the second ink composition and may be 0.8 mass % or less or 0.5 mass % or less. The content of the color material (solid content) may be 0.05 mass % or more based on the total mass of the second ink composition and may be 0.1 mass % or more or 0.2 mass % or more.

1.3.2. Water

The second ink composition is an aqueous ink and contains water. An "aqueous" composition is a composition of which one of main solvents is water. The water is the same as that described in the section of the process liquid, and the description thereof will be omitted.

1.3.3. Other Components

The second ink composition may include a water-soluble low molecular organic compound, a surfactant, a resin particle, a water-soluble resin, and other components. These components are the same as those described in the section of the first ink composition, and the description thereof will be omitted.

When the first ink composition and the second ink composition both include resin particles, the resin particles may be resins that are not affected by the aggregation effect of a flocculant. By doing so, an image with further good image quality can be obtained.

1.3.4. Viscosity Increasing Rate

The second ink composition is subjected to the thickening effect and aggregation effect when brought into contact with the process liquid. Consequently, the color development and friction resistance of the formed image can be obtained. The viscosity increasing rate of the second ink composition is 2.2 times or more. The viscosity increasing rate of the second ink composition may be 2.5 times or more, 3.0 times or more, or 3.3 times or more.

The viscosity increasing rate is as already defined. The viscosity increasing rate of the second ink composition is the viscosity increasing rate verified as in the viscosity increasing rate of the first ink composition described above by replacing the first ink composition with the second ink composition.

When the viscosity increasing rate is thus controlled, the aggregation property of the component of the second ink composition is sufficiently obtained when the second ink composition comes into contact with the process liquid, and the image quality of the image formed by the second ink composition is improved.

The upper limit of the viscosity increasing rate of the second ink composition is not limited, but may be 20 times or less, 10 times or less, 8 times or less, 7.0 times or less, or 5 times or less. When the viscosity increasing rate of the second ink composition is within the above range, the image quality, crack resistance, friction resistance, discharge stability, and so on are more improved.

The viscosity increasing rate of the second ink composition can be adjusted by adjusting mainly the type, content, and so on of the color material (including resin dispersant) and resin particle. In particular, the viscosity increasing rate can be easily adjusted by adjusting the type, content, and so on of the color material (including resin dispersant).

1.3.5. Requirement Satisfied by Second Ink Composition

The second ink composition satisfies one or more of the following requirements (1) and (2):

(1) containing a pigment as the color material, wherein the pigment is dispersed in a dispersant resin, and the dispersant resin is a block copolymer including a block having a carboxy group and a block not having a carboxy group; and (2) containing one or more of maleic acid, acrylic, and urethane water-soluble resins that are soluble in a solvent component of the ink.

When the second ink composition satisfies one or more of the requirements (1) and (2), even in the image region that is formed using the second ink composition as a thin ink, the reactivity with the process liquid can be enhanced, and the image quality of the entire image can be improved.

1.3.5. (1) Block Copolymer of Requirement (1)

The requirement (1) in the second ink composition is "containing a pigment as the color material, wherein the pigment is dispersed in a dispersant resin, and the dispersant resin is a block copolymer including a block having a carboxy group and a block not having a carboxy group".

As already described, a pigment dispersed in a dispersant resin can be selected as a color material. In the requirement (1), the dispersant resin is a block copolymer including a block having a carboxy group and a block not having a carboxy group.

In the block copolymer, the block having a carboxy group is a hydrophilic block. When the carboxy group reacts with a flocculant to lose the charge, the individual pigments aggregate. On this occasion, since the hydrophobic portion of the dispersant resin is divided into blocks, the hydrophobicity of the hydrophobic block is strong. Consequently, solid-liquid separation of the pigment aggregate is likely to occur to promote the solid-liquid separation of the pigment aggregate. That is, the block copolymer is a hydrophobic block and is thereby easily solid-liquid separated.

The number of the blocks of the block copolymer may be a diblock, triblock, or higher-order block. The block copolymer includes, for example, a structural unit derived from a (meth)acrylic acid monomer and includes a hydrophilic block having a carboxy group and a hydrophobic block not having a carboxy group.

The hydrophobic block of the block copolymer has effect of accumulating, coating, and encapsulating the pigment. The other block, i.e., the hydrophilic block includes a carboxy group derived from (meth)acrylic acid and has effect of adding a carboxy group to the pigment surface. When the block copolymer is obtained by polymerization in the presence of a pigment or when the liquid properties of a dispersion medium involve phase inversion, for example, including a process of coating a pigment with a block copolymer, the hydrophobic block is dissolved in a dispersion medium during oil dispersion, and the hydrophilic block attaches to the pigment to show good dispersibility. In contrast, after neutralization with alkaline water, there is a mechanism in which the hydrophobic block attaches to the pigment, and the hydrophilic block creates charge on the pigment surface to maintain good dispersibility by electric repulsion.

The number average molecular weight of the hydrophobic block in the block copolymer may be within a range of 1000 or more and 20000 or less. The acid value based on the carboxy group of the hydrophilic block may be 100 mg KOH/g or more and 250 mg KOH/g or less. The molecular weight of the hydrophilic block (the molecular weight obtained by subtracting the number average molecular weight of the hydrophobic block from the number average molecular weight of the block copolymer) may be within a range of 1000 or more and 10000 or less. Furthermore, the number average molecular weight of the block copolymer may be within a range of 2000 or more and 30000 or less. The molecular weight distribution (weight average molecular weight/number average molecular weight) of the block copolymer may be 1.6 or less.

Thus, the block copolymer has a carboxy group in the hydrophilic block. When the hydrophilic block reacts with a flocculant to lose the charge, the hydrophobic portion is divided into blocks. Therefore, the hydrophobicity is strong, solid-liquid separation from water is easy, and the pigment aggregates to promote the solid-liquid separation from water. In addition, the hydrophilic portion is divided into blocks, and there is effect that the reactivity with a flocculant is high. The carboxy group may be a salt.

1.3.5. (2) Water-Soluble Resin of Requirement (2)

The requirement (2) in the second ink composition is "containing one or more of maleic acid, acrylic, and urethane water-soluble resins that are soluble in a solvent component of the ink".

The water-soluble maleic acid resin, the water-soluble acrylic resin, and the water-soluble urethane resin are as described in the above section of "1.2.3. (4) Water-soluble resin".

The water-soluble resin may have reactivity with the flocculant in the process liquid, and has an acidic group such as a carboxy group and thereby has an acid value. When the water-soluble resin also includes a hydrophobic portion, solid-liquid separation more readily occurs in the hydrophobic portion at the time of losing charge by reaction of the acidic group with a flocculant to precipitate the resin, and thereby the reactivity increases. In a maleic acid resin, one of the two carboxy groups may be esterified because of higher reactivity.

The reactivity of the water-soluble resin is tested and decided by the following method. (1) The resin component of each resin product is adjusted to 5 mass % with water (resin aqueous medium solution). (2) 5 g of a 5 mass % aqueous solution of calcium propionate is put in a screw tube, and 0.5 g of the resin aqueous medium solution of the above (1) is dropwise added thereto, followed by stirring. (3) When the aggregation of the resin is observed by white cloudiness, solid precipitation, or the like, it is judged to be reactive.

Resin particles can also be considered as the reacting resin. However, resin particles tend to reduce the discharge reliability of the ink with drying of the ink. In contrast, since a water-soluble resin has less such tendency, the water-soluble resin may be provided with the reactivity.

A water-soluble resin tends to increase the viscosity of the ink, which is advantageous also from the point of adjusting the viscosity of the second ink composition (thin ink) to the viscosity of the first ink composition (thick ink) using the above. When the first ink composition and the second ink composition both include a water-soluble resin, the content of the second ink composition may be higher than that of the first ink composition. The water-soluble resin need not be included in the first ink composition. A resin particle causes less increase in viscosity compared to the water-soluble resin.

When the second ink composition includes a water-soluble resin, the content of the water-soluble resin is 2 mass % or less based on the total mass of the second ink composition and may be 1.5 mass % or less, 1.0 mass % or less, or 0.5 mass % or less.

1.3.6. Manufacturing and Physical Properties

The second ink composition is obtained by mixing the above-described components in an arbitrary order and removing impurities by filtration or the like as needed. The method for mixing each component may be a method of adding the materials sequentially to a container equipped with a stirring device such as a mechanical stirrer or a magnetic stirrer and stirring and mixing them. The method for the filtration can be performed by, for example, centrifugal filtration or filter filtration as needed.

The second ink composition may have a surface tension (static surface tension) of 18 mN/m or more and 40 mN/m or less at 20° C. from the viewpoint of the balance between the image quality and the reliability as an ink for ink jet recording. The surface tension may be 20 mN/m or more and 35 mN/m or less or 22 mN/m or more and 33 mN/m or less. The surface tension can be measured, for example, using an automatic surface tension meter CBVP-Z (trade name, manufactured by Kyowa Interface Science Co., Ltd.) by checking the surface tension when a platinum plate is wetted with the process liquid in an environment of 20° C.

From the same viewpoint, the viscosity of the ink at 20° C. may be 3 mPa·s or more and 10 mPa·s or less or 3 mPa·s or more and 8 mPa·s or less. The viscosity can be measured, for example, using a viscoelasticity tester MCR-300 (trade name, manufactured by Physica) by measuring the viscosity in an environment of 20° C.

2. RECORDING METHOD

The recording method is a method for performing recording on a recording medium using the above-described ink set and includes a process liquid adhesion step of allowing the process liquid to adhere to the recording medium, a first ink adhesion step of allowing the first ink composition to adhere to the recording medium, and a second ink adhesion step of allowing the second ink composition to adhere to the recording medium.

2.1. Recording Medium

The recording medium may be a medium having a recording surface that absorbs an ink or a medium not having the recording surface. Accordingly, the recording medium is not particularly limited, and examples thereof include liquid-absorbing recording media such as paper, a film, and cloth, low liquid-absorbing recording media such as actual printing paper, and liquid non-absorbing recording media such as a metal, glass, and a polymer.

The low liquid-absorbing or liquid non-absorbing recording medium refers to a recording medium that has a property of not absorbing at all or hardly absorbing an ink. Quantitatively, the liquid non-absorbing or low liquid-absorbing recording medium refers to a "recording medium having a water absorption amount of 10 $mL/m^2$ or less from the start of contact to 30 $msec^{1/2}$ in the Bristow method". This Bristow method is a most popular method for measuring the amount of liquid absorption in a short time and is adopted also by Japan Technical Association of the Pulp and Paper Industry (JAPAN TAPPI). The details of the test method are described in the standard No. 51 "Paper and Paperboard-Liquid Absorbency Test Method-Bristow method" of the "JAPAN TAPPI Paper Pulp Test Method, 2000 Edition". In contrast, the liquid-absorbing recording medium is a recording medium that does not come under liquid non-absorbency and low liquid absorbency. In the present specification, low liquid absorbency and liquid non-absorbency may be defined simply as low absorbency and non-absorbency, respectively.

Examples of the liquid non-absorbing recording medium include a base material, such as paper, coated with plastic, a base material, such as paper, attached with a plastic film, and a plastic film not having an absorber layer (receiving layer). Examples of the plastic mentioned here include polyvinyl chloride, polyethylene terephthalate, polycarbonate, polystyrene, polyurethane, polyethylene, and polypropylene.

Examples of the low liquid-absorbing recording medium include a recording medium provided with a low liquid-absorbing coating layer on a surface, for example, a medium called coated paper. Examples of the medium of which the base material is paper include actual printing paper such as art paper, coated paper, and matte paper. Examples of the medium of which the base material is a plastic film include polyvinyl chloride, polyethylene terephthalate, polycarbonate, polystyrene, polyurethane, polyethylene, polypropylene or the like having a surface coated with a polymer or the like or coated with a particle such as silica or titanium together with a binder.

As the recording medium, a liquid-absorbing recording medium can also be used. The liquid-absorbing recording medium refers to the above-described "recording medium having a water absorption amount of greater than 10 $mL/m^2$ from the start of contact to 30 $msec^{1/2}$ in the Bristow method".

Examples of the liquid-absorbing recording medium include a liquid-absorbing recording medium obtained by disposing a receiving layer that absorbs a liquid on the surface of the recording medium, for example, ink jet printing paper (paper exclusive for ink jet recording). Examples of the receiving layer that absorbs a liquid include layers constituted of a liquid-absorbing resin, a liquid-absorbing inorganic microparticle, or the like.

Examples of the liquid-absorbing recording medium also include a recording medium of which the base material itself is liquid absorbent, such as fabric made from fibers and paper made from pulp. Examples of paper include plain paper, cardboard, and liner paper. Examples of the liner paper include those made of paper such as kraft paper or waste paper.

2.2. Process Liquid Adhesion Step

The process liquid adhesion step in the recording method according to the present embodiment is a step of allowing the process liquid to adhere to a recording medium.

The process liquid adhesion step can be performed at the same time with the first ink adhesion step and second ink adhesion step described later or before or after the first ink adhesion step and the second ink adhesion step.

Examples of the method for adhesion of the process liquid include immersion coating by immersing a recording medium in the process liquid, roller coating by allowing the process liquid to adhere to a recording medium using a brush, a roller, a spatula, a roll coater, or the like, spray coating by spraying the process liquid with a spray apparatus or the like, and ink jet coating by allowing the process liquid to adhere to a recording medium by an ink jet method. Among these methods, the ink jet method may be used.

In the process liquid adhesion step, the adhesion amount of the process liquid in the area of the recording medium where the ink and the process liquid are attached to lay over may be 5 mass % or more based on the adhesion amount of the ink jet ink attached in the ink adhesion step and may be 7 mass % or more or 9 mass % or more. In contrast, the adhesion amount of the process liquid may be 25 mass % or less based on the adhesion amount of the ink jet ink attached in the ink adhesion step and may be 21 mass % or less, 17 mass % or less, or 13 mass % or less. When the adhesion amount of the process liquid is within the above range, it tends to be possible to achieve both image quality and friction resistance.

The adhesion amount of the process liquid in the area of the recording medium where the ink and the process liquid are attached to lay over may be 0.1 $mg/inch^2$ or more and 5 $mg/inch^2$ or less. The adhesion amount of the process liquid in the area where the adhesion amount of the ink is the maximum in the area where the ink and the process liquid are attached to lay over in the recording medium may be within the above range.

2.3. First Ink Adhesion Step and Second Ink Adhesion Step

The first ink adhesion step in the recording method according to the present embodiment is a step of allowing the first ink composition to adhere to a recording medium. The second ink adhesion step in the recording method according to the present embodiment is a step of allowing the second ink composition to adhere to the recording medium.

Examples of the method for adhesion in each adhesion step include an analog printing method and an ink jet method. Among these methods, the ink jet method of discharging an ink from an ink jet head and allowing the ink to adhere to a recording medium may be used. The first ink composition and the second ink composition may be ink jet inks that are used in recording by an ink jet method.

In the first ink adhesion step and the second ink adhesion step, the adhesion amount of the ink per unit area of a recording medium in the area of the recording medium to which the ink is allowed to adhere may be 3 $mg/inch^2$ or more, 5 $mg/inch^2$ or more, or 10 $mg/inch^2$ or more. The adhesion amount of the ink per unit area of the recording medium may be 20 $mg/inch^2$ or less, 18 $mg/inch^2$ or less, or 16 $mg/inch^2$ or less. The adhesion amount of the ink per unit area of the recording medium in the area where the adhesion amount of the ink is the maximum in the area to which the ink is allowed to adhere, that is, the maximum adhesion amount of the ink may be within the above range.

2.4. Serial Recording Method

The recording method according to the present embodiment may be serial type recording that performs recording by a plurality of times of main scanning and performs a plurality of times of main scanning on the same scanning region. That is, the process liquid adhesion step, the first ink adhesion step, and the second ink adhesion step may be performed as a serial recording method.

Figure 2:
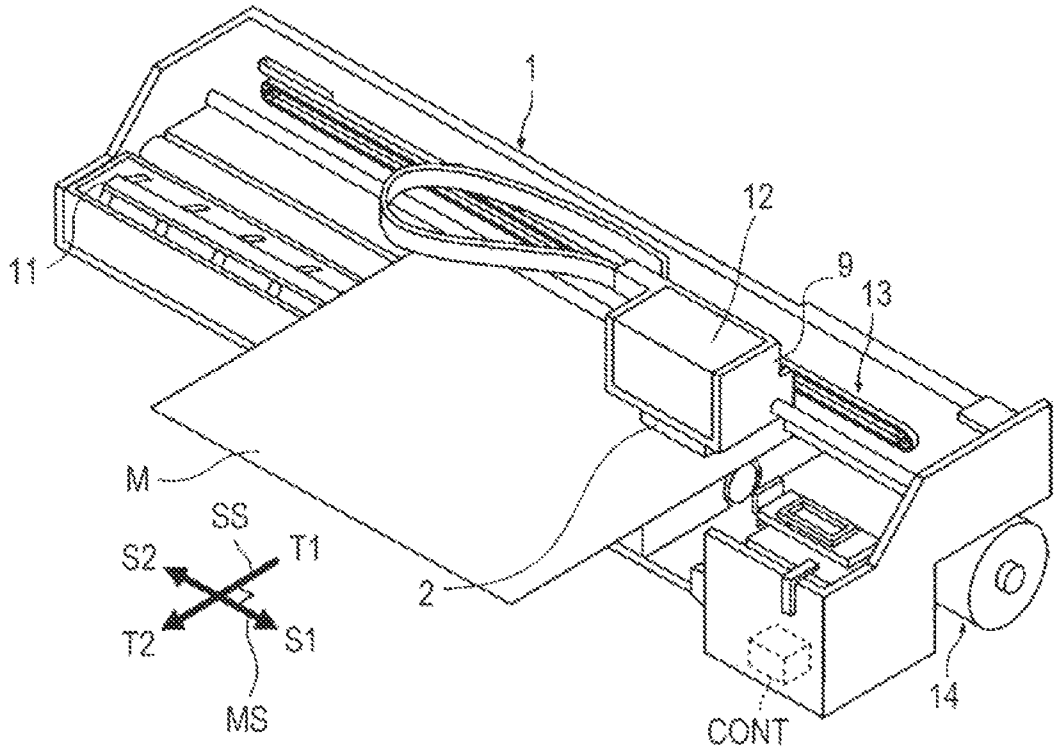
FIG. 2 is a schematic view of the area around the carriage of an example of an ink jet recording apparatus.

For example, the process liquid adhesion step, the first ink adhesion step, and the second ink adhesion step can be carried out as a serial recording method using an ink jet recording apparatus having a serial type recording head (recording head 2) as shown in FIGS. 1 and 2 described later. In the serial recording method, the process liquid adhesion step, the first ink adhesion step, and the second ink adhesion step are performed by a plurality of times of main scanning for allowing the process liquid, the first ink composition, and the second ink composition to adhere to the same scanning region of a recording medium M while changing the relative position between the recording head 2 and the recording medium M in the main scanning direction MS and a plurality of times of sub-scanning that changes the relative position between the carriage 9 and the recording medium M in the sub-scanning direction SS that crosses the main scanning direction MS. The number of times of the main scanning may be 20 or less, 15 or less, or 9 or less. The number of times of the main scanning may be 2 or more, 3 or more, or 4 or more.

In this case, a plurality of nozzle rows each consisting of a plurality of nozzles arranged in the sub-scanning direction SS may be provided along the main scanning direction MS on the nozzle face (not shown) of the recording head 2, the nozzle rows may be arranged such that at least a part thereof overlaps when projected along the main scanning direction MS, and the process liquid and the ink may be discharged from each nozzle row. By doing so, the process liquid, the first ink composition, and the second ink composition are easily discharged and allowed to adhere to the same position in the sub-scanning direction of the recording medium by the same main scanning.

Performing a plurality of times of main scanning on the same scanning region means that the region that has been scanned once is scanned again. For example, when the distance of one sub-scanning is shorter than the length of the nozzle row that discharges the ink in the sub-scanning direction, the scanning region of one main scanning is scanned again. For example, when the distance of one sub-scanning is one-fourth of the length of the nozzle row that discharges the ink in the sub-scanning direction, the main scanning is performed four times in the same scanning region. In this case, the number of times of main scanning is four.

The recording method according to the present embodiment may perform a line recording method that performs recording by one scanning using a line head. That is, even in the line recording method, the effect of the process liquid, the ink set, and the recording method of the present embodiment can be sufficiently achieved.

2.5. Primary Drying Step

The recording method according to the present embodiment may include a primary drying step of drying the ink and process liquid adhered to the recording medium.

The primary drying step is a step of drying the ink adhered to a recording medium at an early stage. The primary drying step is a step of drying at least a part of the solvent component of the ink adhered to the recording medium to at least an extent that reduces the flow of the ink. The primary drying step may be performed by blowing without heating, may be performed such that the ink adheres to a heated recording medium, or may be heated at an early stage after the adhesion. In the primary drying step, the drying may begin within 0.5 seconds at the latest after landing of ink droplets on the recording medium. The primary drying step may be performed also for the adhered process liquid as in the ink.

The primary drying step may be blowing warm air to the recording medium using an IR heater, microwave radiation, a platen heater, or a fan.

When the primary drying step is performed by heating, the step may be performed at least any one of before the process liquid adhesion step, first ink adhesion step, and second ink adhesion step, simultaneously with the adhesion, or early after the adhesion and may be performed simultaneously with the adhesion. With such a heating order, the process liquid adhesion step, the first ink adhesion step, and the second ink adhesion step can be performed.

When the ink adheres to a heated recording medium, the heating temperature by the primary drying step is the surface temperature of the recording medium when the ink adhered thereto. When heating is performed early after the adhesion of the ink, the heating temperature is the surface temperature of the recording medium when heating is performed. The heating temperature is the highest temperature in heating in the primary heating step.

The heating temperature in the primary drying step may be 28° C. or more, 30° C. or more, 32° C. or more, or 34° C. or more as the surface temperature of recording surface of the heated recording medium. The heating temperature in the primary drying step may be 40° C. or less, 35° C. or less, or 30° C. or less as the surface temperature of recording surface of the heated recording medium. When the heating temperature in the primary drying step is within the above range, it tends to provide good image quality (aggregation unevenness) and good recovery from clogging. In the recording method of the present embodiment, since the reactivity of the second ink composition is good, low-temperature heating is sufficient, and heating is not necessary.

2.6. Post-Heating Step

The recording method according to the present embodiment may include a post-heating step of heating the recording medium after the process liquid adhesion step, first ink adhesion step, and second ink adhesion step.

The post-heating step is a heating step of completing the recording and sufficiently heating the recorded matter so that it can be used. The post-heating step is a heating step for sufficiently drying the solvent components of the ink and process liquid and heating the resin and so on included in the ink to flatten the ink coating film. The post-heating step may start more than 0.5 seconds after adhesion of the ink and process liquid to the recording medium. For example, the heating for a recording area of the recording medium may start more than 0.5 seconds after completion of all adhesion of the ink and process liquid to the area. The temperature in the primary heating step may be different from the temperature in the post-heating step.

The heating of the recording medium in the post-heating step can be performed, for example, using an appropriate heating means when an ink jet recording apparatus is used. The means is not limited to the heating means equipped with the ink jet recording apparatus, and the heating can be performed with an appropriate heating means. The surface temperature of the recording medium in such a case may be 60° C. or more, 70° C. or more, 80° C. or more, or 85° C. or more. The surface temperature of the recording medium heated in the post-heating step may be 120° C. or less, 110° C. or less, 100° C. or less, or 95° C. or less. According to the recording method according to the present embodiment, even when the surface temperature of the recording medium is within the above range, it tends to sufficiently dry the ink and to give a recorded matter with excellent friction resistance.

2.7. Ink Jet Recording Apparatus

An example of the ink jet recording apparatus that can be suitably used in implementation of each step in the recording method according to the present embodiment will be described with reference to the drawings.

Outline of Apparatus Configuration

FIG. 1 is a schematic cross-sectional view schematically showing an ink jet recording apparatus. FIG. 2 is a perspective view showing an example of the configuration around the carriage of an ink jet recording apparatus 1 of FIG. 1. As shown in FIGS. 1 and 2, the ink jet recording apparatus 1 includes a recording head 2, an IR heater 3, a platen heater 4, a heating heater 5, a cooling fan 6, a pre-heater 7, a ventilation fan 8, a carriage 9, a platen 11, a carriage transport mechanism 13, a transport means 14, and a controller CONT. In the ink jet recording apparatus 1, the operation of the entire ink jet recording apparatus 1 is controlled by the controller CONT shown in FIG. 2.

Configuration of Recording Head

The recording head 2 is a structure for performing recording on a recording medium M by discharging an ink from the nozzle of the recording head 2 and allowing the ink to adhere to the recording medium M. The process liquid can also be handled similarly. The recording head 2 shown in FIGS. 1 and 2 is a serial type recording head and scans a plurality of times in the main scanning direction relative to the recording medium M for allowing an ink and a process liquid to adhere to the recording medium M. The recording head 2 is loaded on the carriage 9 shown in FIG. 2. The recording head 2 scans a plurality of times in the main scanning direction relative to the recording medium M by the operation of the carriage transport mechanism 13 that moves the carriage 9 in the medium width direction of the recording medium M. The medium width direction is the main scanning direction of the recording head 2. Scanning in the main scanning direction is also referred to as main scanning.

Here, the main scanning direction is the direction in which the carriage 9 loading the recording head 2 moves. In FIG. 1, the main scanning direction is a direction crossing the sub-scanning direction which is the transport direction of the recording medium M indicated by the arrow SS. In FIG. 2, the width direction of the recording medium M, i.e., the direction indicated by S1-S2 is the main scanning direction MS, and the direction indicated by T1→T2 is the sub-scanning direction SS. One scanning is performed in the main scanning direction, i.e., in either direction of the arrow S1 or the arrow S2. Recording on the recording medium M is performed by repeating the main scanning of the recording head 2 and the sub-scanning, which is transport of the recording medium M, a plurality of times.

The cartridge 12, which supplies the ink and the process liquid to the recording head 2, includes a plurality of independent cartridges. The cartridge 12 is detachably attached to the carriage 9 loading the recording head 2. The plurality of cartridges can be filled with different types of inks and the process liquid, respectively, and the inks and process liquid are supplied to the respective nozzles from the cartridge 12. In FIGS. 1 and 2, the cartridge 12 shown is an example attached to the carriage 9, but is not limited thereto, and may be provided at a position other than the carriage 9 in a form of supplying the inks and process liquid to each nozzle through supply tubes (not shown).

The discharge by the recording head 2 can use a known system. Here, a system of discharging droplets using vibration of a piezoelectric element, i.e., a discharge system of forming ink droplets or the like by mechanical deformation of an electrostrictive element is used.

Primary Heating Mechanism

The ink jet recording apparatus 1 can include a primary heating mechanism that heats the recording medium M when discharging an ink or process liquid from the recording head 2 and allowing the ink or process liquid to adhere to a recording medium. As the primary heating mechanism, for example, a conduction type, a blower type, or a radiation type can be used. The conduction type conducts heat from a member that is in contact with a recording medium to the recording medium, and an example thereof is a platen heater. The blower type sends ordinary temperature air or warm air to a recording medium to dry an ink or the like, and an example thereof is a blower fan. The radiation type emits heat-generating radiation to a recording medium to heat the recording medium, and an example thereof is IR radiation. A heater (not shown) similar to a platen heater may be provided near the platen heater 4 on the downstream side in the SS direction. These primary heating mechanisms may be used alone or in combination. For example, as the primary heating mechanism, an IR heater 3 and a platen heater 4 are provided.

When the IR heater 3 is used, the recording medium M can be heated by infrared ray radiation in the radiation type from the recording head 2 side. Consequently, although the recording head 2 is also likely to be heated simultaneously, it is possible to increase the temperature without being affected by the thickness of the recording medium M, compared to heating the recording medium M from the back side with, for example, the platen heater 4. Various fans (for example, the ventilation fan 8) that applies warm air or air of the same temperature as the environment to a recording medium M for drying the ink or the like on the recording medium M may be provided.

The platen heater 4 can heat the recording medium M through the platen 11 at the position facing the recording head 2. The platen heater 4 can heat the recording medium M by conduction and is used in an ink jet recording method as needed.

The ink jet recording apparatus 1 may include a pre-heater 7 that heats the recording medium M in advance before the ink or process liquid adheres to the recording medium M.

Post-Heating Mechanism

A post-heating mechanism of heating the recording medium to dry and fix the ink or the like may be provided after the process liquid adhesion step, the first ink adhesion step, and the second ink adhesion step.

The heating heater 5 used in the post-heating mechanism dries and solidifies the ink and so on adhered to the recording medium M. The heating heater 5 heats the recording medium M with an image recorded thereon to more rapidly evaporate and scatter water and so on contained in the ink and process liquid, and thereby an ink film is formed by the resin contained in the ink. Thus, the ink film is firmly fixed or attached on the recording medium M and has an excellent film forming property, and an excellent image with high image quality is obtained in a short time.

Other Components

The ink jet recording apparatus 1 may include a cooling fan 6. After drying the ink and so on recorded on the recording medium M, an ink coating film with high adhesion can be formed on the recording medium M by cooling the ink on the recording medium M by the cooling fan 6.

Under the carriage 9, a platen 11 supporting the recording medium M, a carriage transport mechanism 13 for moving the carriage 9 relative to the recording medium M, and a transport means 14 that is a roller for transporting the recording medium M in the sub-scanning direction are provided. The operation of the carriage transport mechanism 13 and the transport means 14 are controlled by the controller CONT.

Electrical Control

Figure 3:
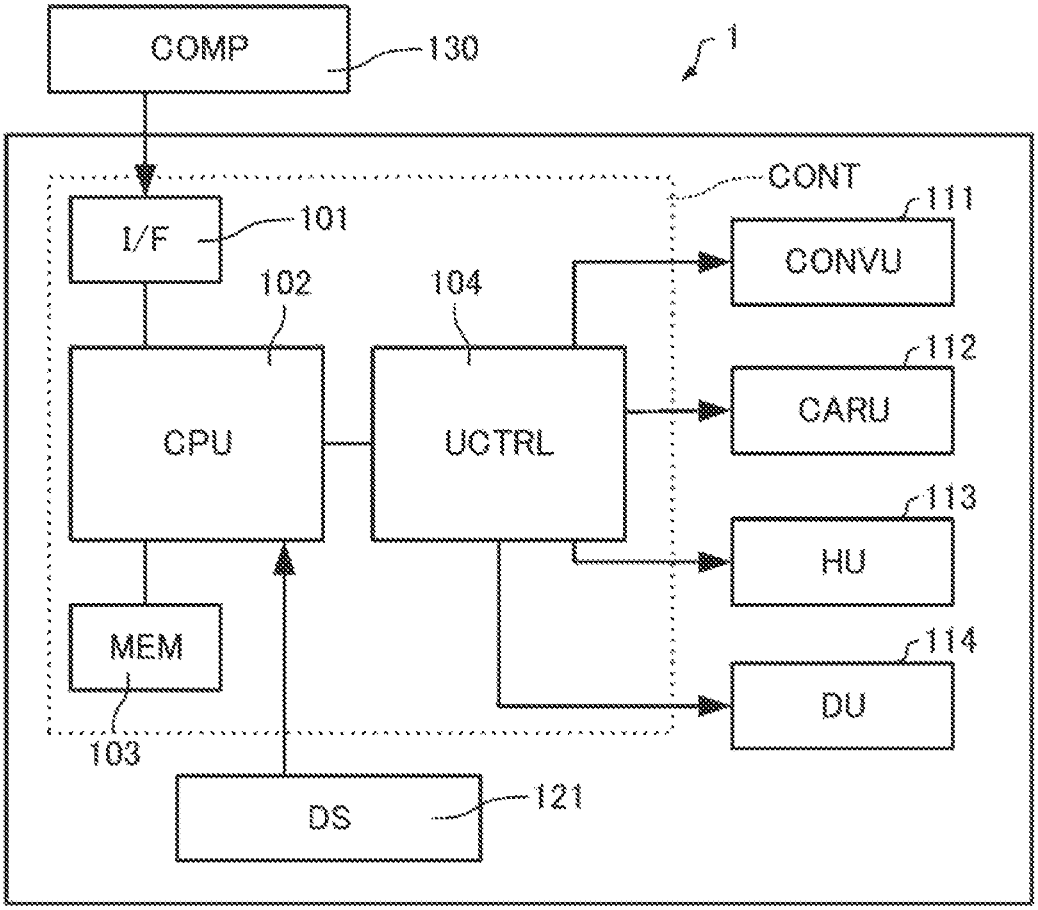
FIG. 3 is a block diagram of an example of an ink jet recording apparatus.

FIG. 3 is a functional block diagram of the ink jet recording apparatus 1. The controller CONT is a control unit for controlling the ink jet recording apparatus 1. The interface unit 101 (I/F) is for sending and receiving data between the computer 130 (COMP) and the ink jet recording apparatus 1. The CPU 102 is an arithmetic processing unit for controlling the entire ink jet recording apparatus 1. The memory 103 (MEM) is for securing an area for storing the program of the CPU 102, a working area, and so on. The CPU 102 controls each unit by a unit control circuit 104 (UCTRL). The detector group 121 (DS) monitors the conditions in the ink jet recording apparatus 1, and the controller CONT controls each unit based on the detection result.

The transport unit 111 (CONVU) controls the sub-scanning (transport) of the ink jet recording, specifically, controls the transport direction and the transport speed of the recording medium M. More specifically, the transport direction and the transport speed of the recording medium M are controlled by controlling the rotation direction and rotation velocity of the transport roller that is driven by a motor.

The carriage unit 112 (CARU) controls the main scanning (path) of the ink jet recording, specifically, reciprocates the recording head 2 in the main scanning direction. The carriage unit 112 includes a carriage 9 loading the recording head 2 and a carriage transport mechanism 13 for reciprocating the carriage 9.

The head unit 113 (HU) controls the discharge quantity of the ink or the process liquid from the nozzles of the recording head 2. For example, when the nozzles of the recording head 2 are driven by a piezoelectric element, the head unit 113 (HU) controls the operation of the piezoelectric element in each nozzle. The head unit 113 controls the timing of adhesion of each ink and the process liquid and the dot sizes of the ink and the process liquid. The adhesion amount of the ink or process liquid per one scanning is controlled by combining the control of the carriage unit 112 and the head unit 113.

The drying unit 114 (DU) controls the temperature of various heaters such as the IR heater 3, the pre-heater 7, the platen heater 4, and the heating heater 5.

The ink jet recording apparatus 1 repeats alternately the operation of moving the carriage 9 loading the recording head 2 in the main scanning direction and the transport operation (sub-scanning). On this occasion, the controller CONT controls the carriage unit 112 when performing each path to move the recording head 2 in the main scanning direction and also controls the head unit 113 to discharge droplets of an ink or process liquid from predetermined nozzle holes of the recording head 2 and allow the droplets of the ink or process liquid to adhere to a recording medium M. The controller CONT controls the transport unit 111 to transport the recording medium M in the transport direction at a predetermined transport amount (feed amount) during the transport operation.

In the ink jet recording apparatus 1, main scanning (path) and sub-scanning (transport operation) are repeated to gradually transport the recording area to which a plurality of droplets adhered. The droplets adhered to the recording medium M are dried by the heating heater 5 to complete an image. Subsequently, the completed recorded matter may be wound into a roll by a winding mechanism or may be transported by a flat-bed mechanism.

3. EXAMPLES AND COMPARATIVE EXAMPLE

The present disclosure will now be specifically described by Examples, but is not limited to these Examples. Hereinafter, "parts" and "%" are based on mass unless otherwise specified. Evaluations were conducted in an environment of a temperature of 25.0° C. and a relative humidity of 40.0% unless otherwise specified.

3.1. Preparation of Ink Jet Ink Composition

Thin inks (second ink compositions) A to G were prepared by putting each component in a container so as to give the compositions of Table 1 shown in FIG. 4, mixing and stirring the components with a magnetic stirrer for 2 hours, and filtering the mixture through a membrane filter of an aperture of 5 μm. Similarly, thick inks (first ink compositions) A to E were prepared so as to give the compositions of Table 2 shown in FIG. 5. Similarly, process liquids A to C were prepared so as to give the compositions of Table 3 shown in FIG. 6. The numerical values of the pigments and resin particles in the tables represent solid content amounts.

Details of the components in Tables 1 to 3 are as follows:

Water-soluble low molecular organic compound (boiling point: 250° C. or less)

Alkanediols

PG: propylene glycol (boiling point: 188° C.)

1,2HD: 1,2-hexanediol (boiling point: 224° C.)

Water-soluble low molecular organic compound (boiling point: higher than 250° C.)

Amides

CPL: ε-caprolactam (boiling point: 267° C.)

Alkanolamines

TIPA: triisopropanolamine (boiling point: 301° C.)

Surfactant

Silicone

BYK-349: silicone-based surfactant (manufactured by BYK Japan K.K.)

Acetylene

SURFYNOL DF110D: acetylene-based surfactant (manufactured by Air Products Japan, K.K.)

Resin Particle

Acrylic

JONCRYL 631 (active component): styrene acrylic resin emulsion (nonreactive resin) (manufactured by BASF)

Polyolefin

Hitec E-6500 (active component): polyethylene wax emulsion (nonreactive resin) (manufactured by TOHO Chemical Industry Co., Ltd.)

Water-Soluble Resin

Maleic Acid

ARASTAR 703S (active component): maleic acid water-soluble resin (reactive resin) (manufactured by Arakawa Chemical Industries, Ltd.)

Acrylic

Sokalan HP 69 AP (active component): acrylic water-soluble resin (reactive resin) (manufactured by BASF)

Flocculant

Cationic Resin

Catiomaster PD-7 (active component): amine-epichlorohydrin cationic resin (manufactured by Yokkaichi Chemical Co., Ltd.)

Pigment Dispersion

Block Polymer Dispersion

Cyan pigment 1 (active component)

Manufactured as Follows:

A reaction vessel equipped with a reflux tube, a gas introduction device, a thermometer, and a stirrer was charged with 198.2 parts of diethylene glycol monobutyl ether, 1.0 parts of iodine, 3.7 parts of 2,2'-azobis(4-methoxy-2,4-dimethylvaleronitrile), 66.1 parts of tricyclodecyl methacrylate, and also 0.17 parts of diphenylmethane as a catalyst. The mixture was polymerized at 45° C. for 5 hours while flowing nitrogen to obtain a solution of A polymer block. Subsequently, the polymerization temperature was decreased to 40° C., and 44.0 parts of tricyclodecyl methacrylate, 17.2 parts of methacrylic acid, and 1.2 parts of 2,2'-azobis(4-methoxy-2,4-dimethylvaleronitrile) were added to the solution of the A polymer block obtained above. After polymerization for 4 hours, the temperature was raised to 70° C. to perform polymerization for 1 hour to form B polymer block to obtain a solution of A-B block polymer. The solution of A-B block polymer obtained above was cooled, and 66.1 parts of diethylene glycol monobutyl ether was then added thereto, followed by drying at 150° C. for 1 hour to obtain a polymer having a solid content of 33.0%. 341 parts of the above polymer, 163.6 parts of butyl carbitol, and 450 parts of, a cyan pigment, C.I. Pigment Blue 15:3 were blended and stirred with a disper. Subsequently, the pigment was sufficiently dispersed with a horizontal media disperser to obtain an oil pigment dispersion. Subsequently, while stirring 700 parts of the above-obtained oil pigment dispersion with a disper, a mixture consisting of 4.0 parts of potassium hydroxide and 341 parts of water was gradually added thereto for neutralization to perform phase transition.

Subsequently, the pigment was sufficiently dispersed again with a horizontal media disperser to obtain an aqueous pigment dispersion 1.

Pigment Dispersion

Random Polymer Dispersion

Cyan pigment 2 (active component)

Manufactured as Follows:

In a reaction vessel equipped with a stirrer, a back flow condenser, and a thermometer, 52.2 parts of triethylene glycol monobutyl ether and 52.2 parts of propylene glycol monomethyl ether were placed, followed by heating to 75° C. In another vessel, 20 parts of styrene, 10 parts of methacrylic acid, 20 parts of 2-hydroxyethyl methacrylate, 15 parts of methyl methacrylate, 15 parts of ethyl methacrylate, 20 parts of 2-ethylhexyl methacrylate, and 4 parts of 2,2'-azobis(isobutyronitrile) (AIBN) were placed, followed by thoroughly stirring to prepare a monomer solution. After adding ⅓ amount of the prepared monomer solution to the reaction vessel, the remaining ⅔ amount of the monomer solution was slowly dropped into the reaction vessel over 1.5 hours. Polymerization was performed for 3.5 hours after the completion of the dropping, and 0.5 parts of AIBN was then added thereto. The mixture was heated to 85° C. to perform polymerization for further 2 hours. In another vessel, 4.7 parts of sodium hydroxide and 47.5 parts of water were placed, followed by thoroughly stirred to prepare a neutralization solution. The prepared neutralization solution was added to the reaction vessel to stop the polymerization to obtain a polymer solution (solid content: 41.5%). 90 parts of the above polymer and 340 parts of deionized water were mixed into a homogeneous solution, and 150 parts of a cyan pigment, C.I. Pigment Blue 15:3, was added thereto. The mixture was peptized with a disper to prepare a mill base, followed by distributed processing for 2 hours. The pigment concentration was adjusted to 15% with deionized water to obtain a pigment dispersion 2.

The viscosity increasing rate of each ink composition was determined as follows, and the results are shown in Table 1 (FIG. 4) and Table 2 (FIG. 5). Each ink composition and a 5 mass % aqueous solution of calcium propionate were mixed and stirred at a mass ratio of the ink:the 5 mass % aqueous solution of calcium propionate of 10:1, and the ratio (magnification) of the viscosity of the mixture solution after mixing to the viscosity of the ink before mixing was determined. As the viscosity, the value of shear rate 200 (1/s) at 20° C. was measured using a rheometer MCR302e (manufactured by Anton Paar GmbH).

3.2. Evaluation Method 3.2.1. Recording Test

Condition: SC-R5050 (manufactured by Seiko Epson Corporation) modified machine was provided;

Resolution: 1200×1200 dpi;

Printing pattern: solid pattern (deep color+light color cyan);

Number of times of main scanning: 9 times;

Paper surface temperature: shown in Table 4;

Secondary drying temperature (post-heating temperature): 80° C.;

Recording medium: Orajet 3165G-010 (manufactured by ORAFOL Japan Inc., vinyl chloride film); and Platen gap: 1.7 mm.

3.2.2. Evaluation of Friction Resistance

SC-R5050 was filled with a process liquid, a thick ink, and a thin ink of each Example in Table 4 shown in FIG. 7, and a solid pattern (deep color ink adhesion amount: 10 mg/inch$^2$, light color ink adhesion amount: 5 mg/inch$^2$, process liquid adhesion amount: 1.5 mg/inch$^2$) was printed on a recording medium. After leaving the recording medium to stand at room temperature for 30 minutes, the ink adhesion portion was cut into a 30×150 mm rectangle and was rubbed 100 times with a Gakushin-type rubbing tester (load: 500 g) using plain woven cloth wet with water, and the degree of peeling of the ink was visually evaluated. Evaluation was performed by the following criteria, and the results are shown in Table 4.

AA: No peeling was observed;

A: Peeling of less than 20% of the evaluated area was observed;

B: Peeling of less than 50% of the evaluated area was observed; and

C: Peeling of 50% or more of the evaluated area was observed.

3.2.3. Evaluation of Image Quality

SC-R5050 was filled with a process liquid, a thick ink, and a thin ink of each Example in Table 4 shown in FIG. 7, a recording medium was set, and a solid pattern (deep color ink adhesion amount: 10 mg/inch$^2$, light color ink adhesion amount: 5 mg/inch$^2$, process liquid adhesion amount: 1.5 mg/inch$^2$) was printed thereon. The printed matter was visually verified and evaluated by the following criteria. The results are shown in Table 4.

AA: No aggregation unevenness was observed;

A: Not noticeable small aggregation unevenness was observed;

B: Acceptable aggregation unevenness was observed; and

C: Noticeable aggregation unevenness was observed.

3.2.4. Evaluation of Head Dew Condensation

SC-R5050 was filled with a process liquid, a thick ink, and a thin ink of each Example in Table 4 shown in FIG. 7, and a recording medium was set. A solid pattern (deep color ink adhesion amount: 20 mg/inch$^2$, light color ink adhesion amount: 10 mg/inch$^2$, process liquid adhesion amount: 3 mg/inch$^2$) was printed continuously in the printing conditions of Examples shown in the table for 2 hours, and whether nozzle missing occurred or not was verified. Printing was performed in a constant temperature and humidity chamber of 25° C. and 20%. After printing, the print head was detached, and whether dew condensation occurred on the nozzle face or not was verified and evaluated by the following criteria. The results are shown in Table 4.

A: No dew condensation occurred on the nozzle face by printing for 2 hours;

B: Dew condensation occurred on the nozzle face by printing for 2 hours, but no nozzle missing was observed; and C: Dew condensation occurred on the nozzle face by printing for 2 hours to cause nozzle missing.

3.3. Evaluation Result

It was demonstrated from Table 4 (FIG. 7) that in an ink set of a process liquid containing a flocculant, a first ink composition (thick ink) containing a color material, and a second ink composition (thin ink) containing a color material, the viscosity increasing rate of the thin ink was 2.2 times or more and that a solid image with good image quality was obtained by using the ink sets of Examples that satisfy one or more of the requirements (1) and (2).

The present disclosure includes a configuration that is sufficiently the same as the configuration described in the embodiment, for example, a configuration that has the same function, method, and result or a configuration that has the same purpose and effect. In addition, the present disclosure includes a configuration in which non-essential parts of the configuration described in the embodiment are replaced. The present disclosure includes a configuration that achieves the same function and effect or the same purpose as those of the configuration described in the embodiment. The present disclosure includes a configuration in which known technology is added to the configuration described in the embodiment.

From the embodiments and modifications described above, the following contents are derived.

The ink set includes:

a process liquid containing a flocculant;

a first ink composition that contains a color material, is a thick ink, and is an aqueous ink; and a second ink composition that contains a color material, the content of the color material being smaller than that of the color material in the first ink composition, is a thin ink in a similar color to that of the first ink composition, and is an aqueous ink, wherein when the second ink composition and a 5 mass % aqueous solution of calcium propionate are mixed at a mass ratio of "the former:the latter=10:1", the viscosity increasing rate of the former is 2.2 times or more, and the second ink composition satisfies one or more of the following requirements (1) and (2):

(1) containing a pigment as the color material, wherein the pigment is dispersed with a dispersant resin, and the dispersant resin is a block copolymer including a block having a carboxy group and a block not having a carboxy group; and (2) containing one or more of maleic acid, acrylic, and urethane water-soluble resins that are soluble in a solvent component of the ink.

This ink set can enhance the reactivity with the process liquid and improve the image quality of the entire image by satisfying one or more of the requirements (1) and (2), even when a thick ink is used together with a thin ink in which the content of the pigment is smaller than that of the thick ink.

In the above ink set, when the first ink composition and the 5 mass % aqueous solution of calcium propionate are mixed at a mass ratio of "the former:the latter=10:1", the viscosity increasing rate of the former may be 2.2 times or more.

This ink set can give an image with further good image quality.

In the ink set, the viscosity increasing rate of the second ink composition may be 2.2 times or more and 5 times or less.

This ink set can give an image with further good image quality.

In the ink set, the second ink composition may contain a water-soluble resin, and the content of the water-soluble resin may be 1 mass % or less based on the total mass of the second ink composition.

This ink set can give an image with further good image quality.

In the ink set, the second ink composition may contain a water-soluble resin, and the content of the water-soluble resin may be greater than that of the water-soluble resin in the first ink composition.

This ink set can give an image with further good image quality.

In the ink set, the flocculant may be selected from a polyvalent metal salt, an organic acid, and a cationic resin.

This ink set can give an image with further good image quality.

In the ink set, the water-soluble resin may be a resin that is subjected to the aggregation effect of the flocculant.

This ink set can give an image with further good image quality.

In the ink set, the first ink composition and the second ink composition may further include a resin particle, and the resin particle may be a resin that is not subjected to the aggregation effect of the flocculant.

This ink set can give an image with further good image quality.

The recording method is a method for recording on a recording medium using the above ink set, comprising:

a process liquid adhesion step of allowing the process liquid to adhere to a recording medium;

a first ink adhesion step of allowing the first ink composition to adhere to the recording medium; and a second ink adhesion step of allowing the second ink composition to adhere to the recording medium.

This recording method can enhance the reactivity with the process liquid and improve the image quality of the entire image by using a thick ink together with a thin ink in which the content of the pigment is smaller than that of the thick ink and satisfying one or more of the requirements (1) and (2).

In the recording method, in the first ink adhesion step and the second ink adhesion step, the recording medium may have a surface temperature of 35° C. or less.

According to this recording method, since the thin ink has excellent reactivity, an image with good image quality can be recorded even when the surface temperature of the recording medium is 35° C. or less.

In the recording method, the first ink adhesion step and the second ink adhesion step may include a primary drying step.

According to this recording method, an image with further good image quality can be recorded.

In the recording method, the primary drying step may include an air-blowing step.

According to this recording method, an image with further good image quality can be recorded.

In the recording method, the first ink adhesion step and the second ink adhesion step are performed by discharging an ink from an ink jet head and allowing the ink to adhere to the recording medium;

recording is performed by scanning for discharging an ink from the ink jet head a plurality of times, while moving the relative position between the ink jet head and the recording medium; and the number of times of the main scanning for allowing an ink to adhere to the same recording area of the recording medium by the scanning is nine or less.

According to this recording method, an image with further good image quality can be recorded.

What is claimed is:

1. An ink set comprising:

a process liquid containing a flocculant;

a first aqueous ink composition that contains a first pigment as a first color material, and is a thick ink; and a second aqueous ink composition that contains a second pigment as a second color material, and is a thin ink in a similar color to that of the first ink composition, wherein a content of the second pigment contained in the second aqueous ink composition is less than a content of the first pigment contained in the first aqueous ink composition, when the second aqueous ink composition and a 5 mass % aqueous solution of calcium propionate are mixed at a mass ratio of [mass of second aqueous ink composition:mass of 5 mass % aqueous solution=10:1], a viscosity increasing rate of the second aqueous ink composition is 2.2 times or more, and the second pigment contained in the second aqueous ink composition is dispersed with a first dispersant resin, the first pigment contained in the first aqueous ink composition is dispersed with a second dispersant resin, and the second aqueous ink composition contains a first water-soluble resin, the first water soluble resin is one or more of a first maleic acid resin and a first acrylic resin, and is present as a solution dissolved in the second aqueous ink composition without attaching to the second pigment contained in the second aqueous ink composition, and is other than the second dispersant resin contained in the second aqueous ink composition, and a content of the first water-soluble resin in the second aqueous ink composition is greater than a content of a second water-soluble resin in the first aqueous ink composition that is one or more of a second maleic acid resin and a second acrylic resin, and is present as a solution dissolved in the first aqueous ink composition without attaching to the first pigment contained in the first aqueous ink composition, and is other than the second dispersant resin contained in the first aqueous ink composition.

2. The ink set according to claim 1, wherein when the first aqueous ink composition and a 5 mass % aqueous solution of calcium propionate are mixed at a mass ratio of "the former:the latter=10:1", a viscosity increasing rate of the former is 2.2 times or more.

3. The ink set according to claim 1, wherein the viscosity increasing rate of the second aqueous ink composition is 2.2 times or more and 5 times or less.

4. The ink set according to claim 1, wherein a content of the first water-soluble resin is 1 mass % or less based on the total mass of the second aqueous ink composition.

5. The ink set according to claim 1, wherein the first aqueous ink composition contains the second water-soluble resin that is one or more of the second maleic acid resin and the second acrylic resin and is present as a solution as a solution dissolved in the first aqueous ink composition without attaching to the first pigment contained in the first aqueous ink composition and is other than the second dispersant resin contained in the first aqueous ink composition.

6. The ink set according to claim 1, wherein the flocculant is selected from a polyvalent metal salt, an organic acid, and a cationic resin.

7. The ink set according to claim 1, wherein the first water-soluble resin contained in the second aqueous ink composition is subjected to aggregation effect of the flocculant.

8. The ink set according to claim 1, wherein the first aqueous ink composition and the second aqueous ink composition further include a resin particle, and the resin particle is a resin that is not subjected aggregation effect of the flocculant.

9. A recording method for recording on a recording medium using the ink set according to claim 1, the method comprising:

a process liquid adhesion step of allowing the process liquid to adhere to the recording medium;

a first ink adhesion step of allowing the first aqueous ink composition to adhere to the recording medium; and a second ink adhesion step of allowing the second aqueous ink composition to adhere to the recording medium.

10. The recording method according to claim 9, wherein in the first ink adhesion step and the second ink adhesion step, the recording medium has a surface temperature of 35° C. or less.

11. The recording method according to claim 9, wherein the first ink adhesion step and the second ink adhesion step include a primary drying step.

12. The recording method according to claim 11, wherein the primary drying step includes an air-blowing step.

13. The recording method according to claim 9, wherein the first ink adhesion step and the second ink adhesion step are performed by discharging an ink from an ink jet head and allowing the ink to adhere to the recording medium;

recording is performed by main scanning for discharging an ink from the ink jet head a plurality of times, while moving a relative position between the ink jet head and the recording medium; and the number of times of the main scanning for allowing an ink to adhere to the same recording area of the recording medium by the scanning is nine or less.

* * * * *